(12) United States Patent
Haustein et al.

(10) Patent No.: US 8,433,772 B2
(45) Date of Patent: *Apr. 30, 2013

(54) AUTOMATED TAPE DRIVE SHARING IN A HETEROGENEOUS SERVER AND APPLICATION ENVIRONMENT

(75) Inventors: Nils Haustein, Soergenloch (DE); Leonard George Jesionowski, Tucson, AZ (US); Wolfgang Muelller-Friedt, Meisenheim (DE); Ulf Troppens, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/539,671

(22) Filed: Jul. 2, 2012

(65) Prior Publication Data

US 2012/0271888 A1 Oct. 25, 2012

Related U.S. Application Data

(63) Continuation of application No. 12/413,884, filed on Mar. 30, 2009, now Pat. No. 8,255,476.

(51) Int. Cl.
*G06F 15/167* (2006.01)

(52) U.S. Cl.
USPC ........... 709/213; 709/214; 709/215; 709/216; 709/227; 709/228; 709/229; 710/4; 710/5; 710/6; 710/71; 710/72; 710/73; 710/74; 711/112; 711/113; 711/114; 711/115; 711/116; 711/117; 711/118; 711/119; 711/120; 711/121

(58) Field of Classification Search .................. None
See application file for complete search history.

(56) References Cited

U.S. PATENT DOCUMENTS

| 5,721,880 | A | * | 2/1998 | McNeill et al. ............... 703/25 |
| 5,768,623 | A | * | 6/1998 | Judd et al. .................. 710/37 |
| 5,996,024 | A | * | 11/1999 | Blumenau ................. 719/326 |
| 6,061,504 | A | * | 5/2000 | Tzelnic et al. .............. 709/219 |
| 6,085,278 | A | * | 7/2000 | Gates et al. ................. 710/263 |
| 6,182,167 | B1 | * | 1/2001 | Basham et al. .............. 710/38 |
| 6,327,613 | B1 | * | 12/2001 | Goshey et al. .............. 709/208 |
| 6,684,209 | B1 | * | 1/2004 | Ito et al. .................. 707/783 |

(Continued)

OTHER PUBLICATIONS

Office Action (Mail Date Nov. 18, 2011) for U.S. Appl. No. 12/413,884, filed Mar. 30, 2009; Confirmation No. 9979.

(Continued)

*Primary Examiner* — Backhean Tiv
(74) *Attorney, Agent, or Firm* — Schmeiser, Olsen & Watts; Cynthia G. Seal

(57) ABSTRACT

An approach for automatically sharing a tape drive in a heterogeneous computing environment that includes a first computer and second computer is presented. The first computer receives a message that includes a shared tape drive identifier, a source port identifier of the second computer, and a reservation status change for the tape drive. Based on the tape drive identifier, the first computer determines that the tape drive is connected to the first computer. The source port identifier is determined to not identify any host bus adapter installed in the first computer. In response to the first computer determining that the reservation status change indicates a reservation or a release of the tape drive for the second computer, the first computer sets the tape drive offline or online, respectively, in an application executing in the first computer.

14 Claims, 12 Drawing Sheets

U.S. PATENT DOCUMENTS

| | | | |
|---|---|---|---|
| 6,697,895 B1* | 2/2004 | Sherritt et al. | 710/74 |
| 6,950,871 B1* | 9/2005 | Honma et al. | 709/226 |
| 7,292,567 B2* | 11/2007 | Terrell et al. | 370/363 |
| 7,484,039 B2* | 1/2009 | Qiu et al. | 711/114 |
| 7,542,676 B2* | 6/2009 | McGlaughlin | 398/45 |
| 7,568,080 B2* | 7/2009 | Prahlad et al. | 711/162 |
| 7,734,713 B2* | 6/2010 | Gray | 709/213 |
| 7,770,208 B2* | 8/2010 | Barnett et al. | 726/2 |
| 7,856,022 B1* | 12/2010 | Wigmore | 370/395.71 |
| 7,873,806 B2* | 1/2011 | Prahlad et al. | 711/162 |
| 7,904,690 B2* | 3/2011 | Batterywala | 711/170 |
| 7,921,431 B2* | 4/2011 | Smart | 719/328 |
| 7,925,724 B2* | 4/2011 | Gomez et al. | 709/220 |
| 7,970,852 B2* | 6/2011 | Allen et al. | 709/216 |
| 8,028,110 B1* | 9/2011 | Wigmore | 710/74 |
| 8,255,476 B2* | 8/2012 | Haustein et al. | 709/213 |
| 2001/0044863 A1* | 11/2001 | Oeda et al. | 710/104 |
| 2003/0191857 A1* | 10/2003 | Terrell et al. | 709/244 |
| 2004/0073677 A1* | 4/2004 | Honma et al. | 709/226 |
| 2006/0242258 A1* | 10/2006 | Ohtani | 709/216 |
| 2007/0106743 A1* | 5/2007 | Nicholson et al. | 709/213 |
| 2007/0112931 A1* | 5/2007 | Kuik et al. | 709/216 |
| 2007/0156710 A1* | 7/2007 | Kern et al. | 707/100 |
| 2007/0183421 A1* | 8/2007 | Terrell et al. | 370/389 |
| 2007/0239989 A1* | 10/2007 | Barnett et al. | 713/185 |
| 2008/0016311 A1* | 1/2008 | Harada | 711/170 |
| 2008/0040539 A1* | 2/2008 | Haustein et al. | 711/113 |
| 2008/0281993 A1* | 11/2008 | Nicholson et al. | 710/9 |
| 2009/0077552 A1* | 3/2009 | Sekiguchi et al. | 718/1 |
| 2009/0235031 A1* | 9/2009 | Gregg et al. | 711/141 |
| 2009/0307330 A1* | 12/2009 | Allen et al. | 709/216 |
| 2009/0307378 A1* | 12/2009 | Allen et al. | 710/4 |
| 2010/0077106 A1* | 3/2010 | Komikado et al. | 710/5 |
| 2010/0250698 A1* | 9/2010 | Haustein et al. | 709/213 |

OTHER PUBLICATIONS

Amendment filed Feb. 22, 2012 in response to Office Action (Mail Date Nov. 18, 2011) for U.S. Appl. No. 12/413,884, filed Mar. 30, 2009; Confirmation No. 9979.

Notice of Allowance (Mail Date Apr. 17, 2012) for U.S. Appl. No. 12/413,884, filed Mar. 30, 2009; Confirmation No. 9979.

* cited by examiner

AUTOMATED TAPE DRIVE SHARING IN A HETEROGENEOUS SERVER AND APPLICATION ENVIRONMENT This application is a continuation application claiming priority to Ser. No. 12/413,884, filed Mar. 30, 2009.

FIELD OF THE INVENTION

The present invention relates to applications processing data on sequential removable media systems, and more particularly to a method and system for automated tape drive sharing among a plurality of applications of different types in a heterogeneous environment.

BACKGROUND OF THE INVENTION

FIG. 1 is a block diagram of a conventional architecture comprising applications in a heterogeneous environment and a conventional tape library system. Architecture 100 includes a plurality of server computer systems 102-1, ..., 102-N, where each server computer system executes a corresponding application of a plurality of applications 104-1, ..., 104-N in a heterogeneous environment (i.e., so that the applications 104-1, ..., 104-N are associated with the computer systems 102-1, ..., 102-N in a one-to-one correspondence). Each server computer system 102-1, ..., 102-N may execute one or more other applications (not shown). Each server computer system 102-1, ..., 102-N is connected to a tape library 110 via a network 106. Tape library 100 comprises a plurality of tape drives 112-1, ..., 112-M, a plurality of storage slots 114 holding removable media cartridges (not shown) and a cartridge accessor or robot (not shown) moving removable media from slots to drives and vice versa. Network 106 provides a way for applications 104-1, ..., 104-N to communicate with and process data on tape drives 112-1, ..., 112-M included in tape library 110. The protocol for the communication between the applications and tape drives is, for example, based on the Small Computer System Interface (SCSI).

Tape library 110 also comprises a tape library controller 116 which controls the cartridge accessor and tape drives 112-1, ..., 112-M. Tape library controller has a connection 118 (a.k.a. library-drive interface) to the tape drives 112-1, ..., 112-M, which allows the tape library controller to obtain status information from the tape drives, such as a tape drive serial number, error logs, and drive status, or to test the tape drives.

Tape library controller 116 is connected to server computer systems 102-1, ..., 102-N and applications 104-1, ..., 104-N via a network 108 (e.g., an Ethernet-based network). Network 108 allows server computer systems 102-1, ..., 102-N and applications 104-1, ..., 104-N to configure and manage tape library 110 (e.g., set up logical libraries and corresponding policies and to obtain error logs and status information from the tape library and tape drives). As one example, server computer system 102-1 and application 104-1 may automatically obtain information about tape library 110 and tape drive errors through the Simple Network Management Protocol (SNMP) protocol. Network 108 may be the same network as network 106 or a different network from network 106.

The multiple applications 104-1, ..., 104-N using one tape library 110 are limited in that applications of different types are not able to share one tape drive because applications are not able to handle concurrent access to one tape drive. For example, if application 104-1 accesses tape drive 112-1, it may send a SCSI RESERVE command to reserve the tape drive for the time of the access. When application 104-1 has finished the access to tape drive 112-1, application 104-1 sends the corresponding SCSI RELEASE command. If application 104-N wants to access tape drive 112-1 at the time the tape drive is reserved by application 104-1, then the application 104-N receives an error message indicating the tape drive 112-1 is reserved, thereby causing application 104-N to set the tape drive 112-1 offline. In conventional systems, this offline condition then requires time-consuming manual intervention. As one example, an administrator addresses the aforementioned error message by manually setting the tape drive 112-1 online in application 104-N. In another example, when application 104-1 accesses tape drive 112-1 in a heterogeneous environment, the tape drive 112-1 is manually set offline in the application 104-N and when the application 104-1 has finished accessing tape drive 112-1, the tape drive 112-1 is manually set online in the application 104-N. In general, whenever a tape drive is reserved by one application in a heterogeneous environment, the tape drive is manually set offline in all other applications sharing the same tape drive, and when the tape drive is released by that application, the tape drive is manually set online in all other applications sharing the same tape drive. Therefore, each of the applications 104-1, ..., 104-N requires at least one dedicated tape drive in tape library 110, which consumes additional physical resources and energy, and increases the cost of a conventional system. Thus, there exists a need to overcome at least one of the preceding deficiencies and limitations of the related art.

SUMMARY OF THE INVENTION

In first embodiments, the present invention provides a computer-implemented method of automatically sharing a tape drive in a heterogeneous computing environment. The method comprises:

a first computer system receiving a first message that includes an identifier of a tape drive shared among a plurality of computer systems in the heterogeneous computing environment, an identifier of a source port of a second computer system, and an indication of a first change in a reservation status of the tape drive, where the first computer system and the second computer system are included in the plurality of computer systems;

the first computer system determining the tape drive is connected to the first computer system based on the identifier of the tape drive;

the first computer system determining the identifier of the source port does not identify any host bus adapter installed in the first computer system;

the first computer system determining the indication of the first change indicates a first command from the second computer system that reserves the tape drive for the second computer system; and responsive to determining the indication of the first change indicates the first command, the first computer system setting the tape drive offline in a first application executing in the first computer system.

In second embodiments, the present invention provides a computer-implemented, library reservation agent-based method of automatically sharing a tape drive in a heterogeneous computing environment. The method comprises:

a library reservation agent determining a change in a reservation status of a tape drive based on a command received by the tape drive, where the library reservation agent is a software agent executing in a tape library controller coupled via a network to a plurality of computer systems in the heterogeneous environment, and where each computer system of the plurality of computer systems executes a drive-sharing agent;

the library reservation agent determining an identifier of the tape drive;

the library reservation agent determining the tape drive is shared among the plurality of computer systems, where determining the tape drive is shared is based on the identifier of the tape drive;

the library reservation agent determining an identifier of a source port of a first computer system of the plurality of computer systems, where the command is received by the tape drive from the first computer system; and the library reservation agent sending a message to the drive-sharing agent executing in the plurality of computer systems, where the message includes the identifier of the tape drive, the identifier of the source port, and an indication of the change in the reservation status of the tape drive, where a result of the sending the message is a state of the tape drive being set in an application based on the change in the reservation status and being set by the drive-sharing agent executing in a second computer system of the plurality of computer systems, and where the application is executing in the second computer system.

In third embodiments, the present invention provides a computer-implemented, reservation-sharing agent-based method of automatically sharing a tape drive in a heterogeneous computing environment. The method comprises:

a reservation-sharing agent determining a change in a reservation status of a tape drive based on a command received by the tape drive, where the reservation-sharing agent is a software agent executing in a tape library controller coupled via a network to a plurality of computer systems in the heterogeneous environment;

the reservation-sharing agent determining an identifier of the tape drive;

the reservation-sharing agent determining the tape drive is shared among the plurality of computer systems, where determining the tape drive is shared is based on the identifier of the tape drive;

the reservation-sharing agent determining an identifier of a source port of a first computer system of the plurality of computer systems, where the command is received by the tape drive from the first computer system;

the reservation-sharing agent determining the tape drive is connected to a second computer system of the plurality of computer systems based on the identifier of the tape drive;

the reservation-sharing agent determining the identifier of the source port does not identify any host bus adapter installed in the second computer system;

the reservation-sharing agent determining the change in the reservation status includes a reservation of the tape drive for the first computer system by the command; and responsive to determining the change in the reservation status includes the reservation of the tape drive, the reservation-sharing agent setting the tape drive offline in an application executing in the second computer system.

Systems and computer program products corresponding to the above-summarized methods are also described herein.

One or more embodiments of the present invention provide a technique for allowing multiple applications to share one tape drive automatically and transparently in a heterogeneous environment. As the library reservation agent and drive-sharing agent are independent from the applications installed on the server computer systems, the novel tape drive sharing methods described herein do not require any changes to the applications.

DETAILED DESCRIPTION OF THE INVENTION

Overview

One or more embodiments of the present invention provide automated and transparent tape drive sharing among a plurality of applications of different types running on a plurality of server computer systems in a heterogeneous environment. As used herein, a heterogeneous environment is defined as a computing environment that includes different applications from different vendors fulfilling a similar purpose and running different platforms. An example of a heterogeneous environment is an open system. The tape library system described herein may comprise a novel library reservation agent that determines when a shared tape drive is reserved by an application using novel methods and subsequently sends a message to corresponding novel drive-sharing agents via a network. The drive-sharing agents are installed on all server computer systems (a.k.a. hosting servers) hosting applications that share tape drives and are configured for corresponding applications. A drive-sharing agent determines whether the application for which the drive-sharing agent is configured has access to a shared tape drive indicated in a message from the library reservation agent and whether the application has reserved the tape drive. Based on this determination, the drive-sharing agent automatically sets the tape drive offline for the application for which the drive-sharing agent is configured. Furthermore, a shared tape drive is automatically set online in an application by an associated drive-sharing agent in response to the library reservation agent determining that the shared tape drive has been released. Each application provides an administrative command line interface for which the drive-sharing agent is configured which allows the drive-sharing agent to set a shared tape drive offline or online in the application.

In one embodiment, drive-sharing agents are not separately installed on hosting servers but are instead integrated into the library-reservation agent. Thus, installation of additional processes on the server computer systems is not required.

In another embodiment, a handshake mechanism with subsequent automated actions is described herein for sending the message from the library reservation agent to the drive-sharing agent in order to assure that the message has arrived and has been processed.

Automatic Tape Drive Sharing System

Figure 1:
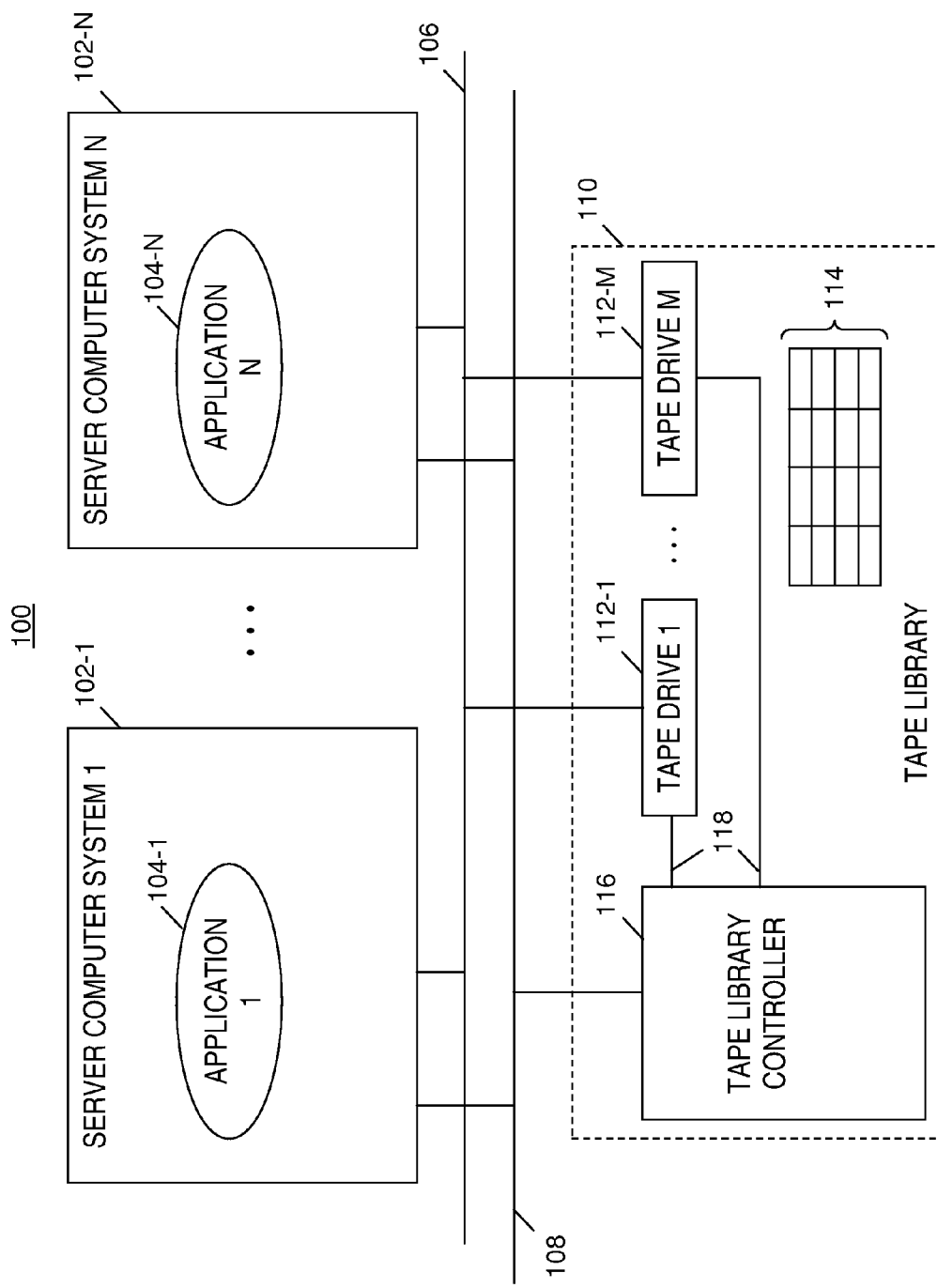
FIG. 1 is a block diagram of a prior art architecture in which manual intervention provides tape drive sharing in a heterogeneous environment.
Figure 2:
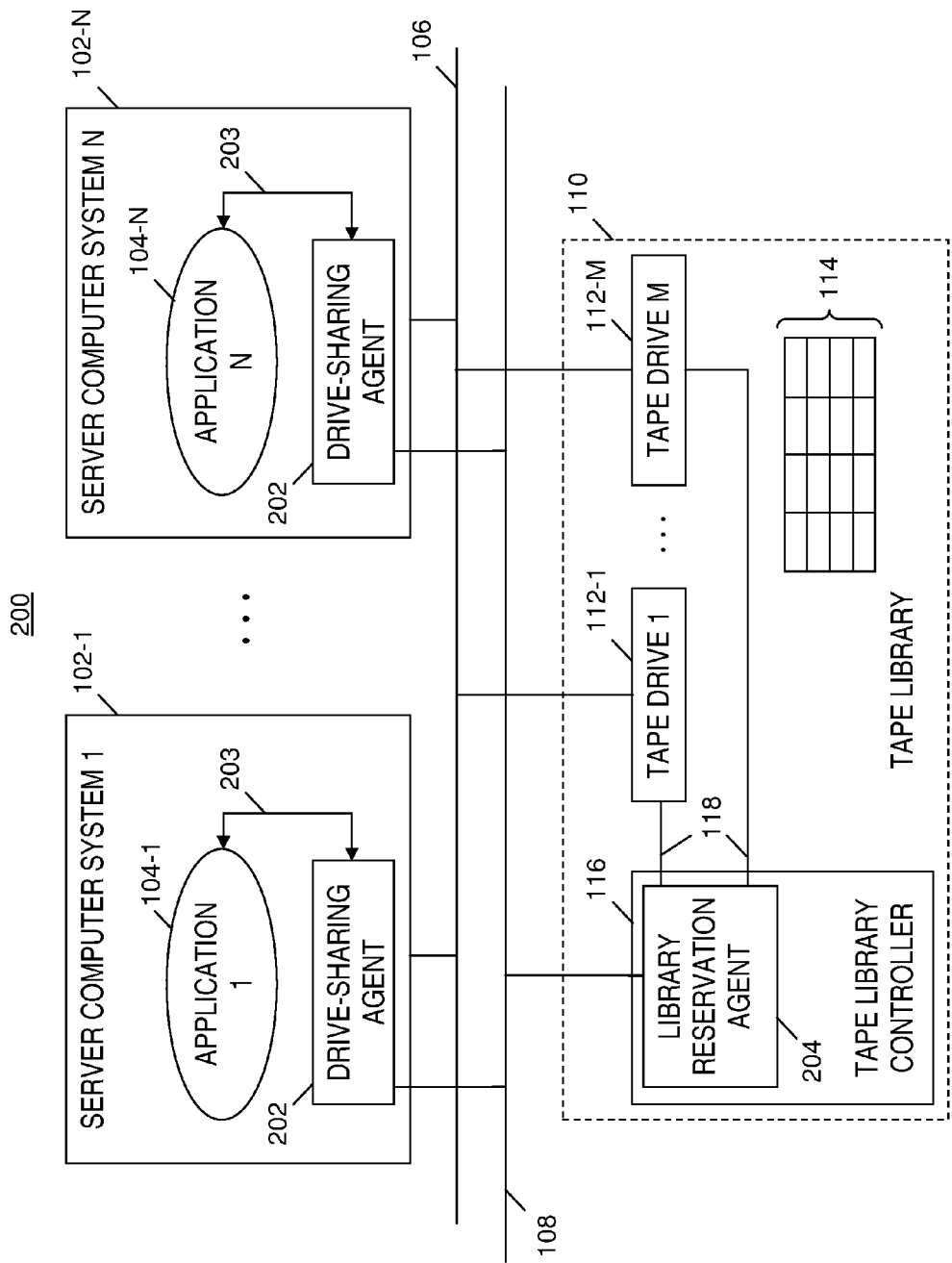
FIG. 2 is a block diagram of a system for automatically sharing tape drives in a heterogeneous environment, in accordance with embodiments of the present invention.

FIG. 2 is a block diagram of a system for automatically sharing tape drives in a heterogeneous environment, in accordance with embodiments of the present invention. A tape drive sharing system 200 is a heterogeneous environment that includes the following components: a plurality of server computer systems 102-1, . . . , 102-N, a plurality of applications 104-1, . . . , 104-N, network 106, network 108, tape library 110, a plurality of tape drives 112-1, . . . , 112-M, tape library controller 116, and library-drive interface 118. The aforementioned components of system 200 have the same functionality and configuration as described above relative to FIG. 1, except that (1) each server computer system 102-1, . . . , 102-N also executes a novel drive-sharing agent 202 connected to the corresponding application 104-1, . . . , 104-N by a command line interface 203; and (2) the tape-library controller 116 also executes a novel library reservation agent 116, which is connected to network 108 and is connected to tape drives 112-1, . . . , 112-M via interface 118.

Library reservation agent 204 extends the tape library controller 116. The library reservation agent 204 receives a message from a tape drive 112-1, . . . , 112-M via library drive interface 118 in response to the tape drive receiving a command to reserve or release the tape drive via network 106 from an application 104-1, . . . , 104-N (e.g., a SCSI RESERVE or SCSI RELEASE command). The tape drive microcode is changed to send the message to the library reservation agent 204 upon reception of a command to reserve or release the tape drive. In an alternate embodiment, drive-sharing agent 202 and library reservation agent 204 are executed in a physical server computer system (not shown) that is different from any of server computer systems 102-1, . . . , 102-N, where the physical server computer system is connected to server computer systems 102-1, . . . , 102-N and to tape library 110 via network 108. In another alternate embodiment, drive-sharing agent 202 and library reservation agent 204 are executed in a software image of a virtual server (not shown) that is connected to server computer systems 102-1, . . . , 102-N and to tape library 110 via network 108.

In response to receiving the message via library drive interface 118, the library reservation agent 204 determines an identifier (e.g., serial number or World Wide Port Name (WWPN)) of the tape drive and an identifier of the source port (i.e., the port pertaining to the server computer system 102-1, . . . , 102-N from which the aforementioned reserve or release command was sent to the tape drive 112-1, . . . , 112-M). For example, library reservation agent 204 determines the WWPN of the Fibre Channel port pertaining to the server computer system from which the SCSI RESERVE or SCSI RELEASE command was sent to the tape drive. The WWPN of the source port is included in the Fibre Channel protocol stack.

In another embodiment in which system 200 uses an Internet SCSI (iSCSI) implementation, a Transmission Control Protocol/Internet Protocol (TCP/IP) address of the sender (e.g., computer system 102-1, . . . , 102-N) of the aforementioned reserve or release command is determined instead of the WWPN.

In response to receiving the aforementioned message from the tape drive and determining the tape drive identifier and the source port identifier (or the TCP/IP address of the sender of the reserve or release command), library reservation agent 204 sends accordant messages via network 108 to the drive-sharing agents 202 being executed by server computer systems 102-1, . . . , 102-N. These accordant messages may be sent, for example, by the SNMP protocol.

The server computer systems 102-1, . . . , 102-N may include, for example, an IBM® System p™ or System x™ server system (offered by International Business Machines Corporation located in Armonk, N.Y.), an UltraSparc® IV server system (offered by Sun Microsystems, Inc. located in Santa Clara, Calif.), a Proliant® server system (offered by Hewlett-Packard Company located in Palo Alto, Calif.), a PowerEdge® server (offered by Dell, Inc. located in Round Rock, Tex.), etc. Applications 104-1, . . . , 104-N may include, for example, backup applications such as IBM® Tivoli® Storage Manager (offered by International Business Machines Corporation), Netbackup® (offered by Symantec Corporation located in Cupertino, Calif.), Netvault® (offered by BakBone Software, Inc. located in San Diego, Calif.), CommVault Galaxy® (offered by CommVault Systems, Inc. located in Oceanport, N.J.), CA® Disk Backup and Restore (formerly called Brightstor®; offered by Computer Associates International, Inc. located in Islandia, N.Y.), OpenView® Storage Data Protector (offered by Hewlett-Packard Company), etc.

Network 106 may be based on Fibre Channel but may also be based on Ethernet.

Drive-Sharing Agent

Drive-sharing-agent 202 is installed and executes on all server computer systems 102-1, . . . , 102-N connected to tape library 110. Each drive-sharing agent 202 installed on a server computer system 102-1, . . . , or 102-N is configured for the application 104-1, . . . , or 104-N that is running on the same server computer system and that is sharing tape drives 112-1, . . . , 112-M. In one embodiment, the drive-sharing agent 202 may be integrated into the tape device driver, such as the IBM® Tape Device Driver. Hereinafter in this section, "server", "same server" or "hosting server" refers to the server computer system 102-1, . . . , or 102-N on which a given drive-sharing agent 202 is installed.

Figure 3:
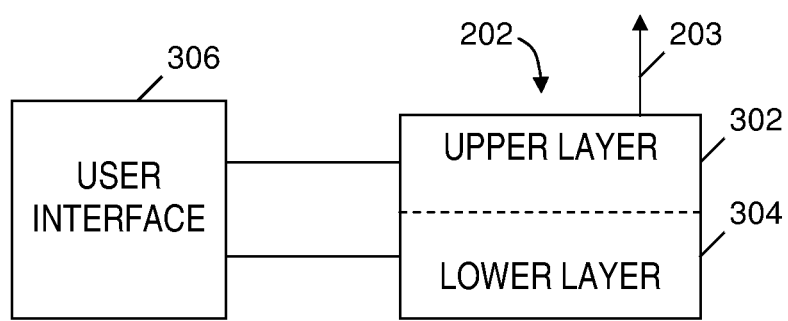
FIG. 3 is a block diagram of a drive-sharing agent in included in the system of FIG. 2, in accordance with embodiments of the present invention.

The drive-sharing agent 202 comprises two layers 302 and 304 as shown in FIG. 3. The lower layer 304 includes capabilities to receive messages from the library reservation agent 204 (see FIG. 2). The messages received from the library reservation agent 204 (see FIG. 2) may be based on prior art protocols such as SNMP.

The lower layer 304 of the drive-sharing agent 202 may also include methods to determine the identifiers of tape drives 112-1, . . . , 112-M (see FIG. 2) connected to the server via commands such as the SCSI INQUIRY command. Additionally, the lower layer 304 may determine the identifiers (e.g., WWPN) of all ports (e.g., Fibre Channel ports) on which tape drives are attached to the server using a system command, such as the lsattr-El fsc0 command under the Advanced Interactive eXecutive (AIX®) operating system.

If the lower layer 304 of the drive-sharing agent 202 is not able to determine the tape drive identifier and/or the port identifiers (e.g., WWPN) for the hosting server (i.e., server computer system 102-1, ..., or 102-N in FIG. 2 on which the drive-sharing agent 202 is installed), a user interface 306 for the drive-sharing agent 202 is used to configure the tape drive identifier and/or port identifier (e.g., WWPN) data manually with the lower layer 304. In one embodiment, each drive-sharing agent 202 maintains a table (not shown; e.g., database table) that includes the identifiers of the tape drives connected to the hosting server and the associated identifiers (e.g., WWPN) of the host bus adapters included in the hosting server and connected to tape drives 112-1, ..., 112-M (see FIG. 2).

The upper layer 302 is configured with the application 104-1, ..., or 104-N that is hosted on the same server. The upper layer 302 may include two methods that act upon tape drives 112-1, ..., 112-M (see FIG. 2): (1) a method to set a tape drive offline and (2) a method to set a tape drive online. These two methods utilize administrative commands provided by a command line interface 203 of the application 104-1, ..., or 104-N (see FIG. 2) hosted on the server. For example, IBM® Tivoli® Storage Manager (TSM) provides an administrative command line client (i.e., dsmadmc), which allows the system to set a tape drive hosted by TSM offline (e.g., update drive status=offline) or online (e.g., update drive status=online). The configuration of the upper layer 302 is flexibly implemented in the drive-sharing agent 202 so that the drive-sharing agent 202 does not need to be recompiled for each application 104-1, ..., 104-N (see FIG. 2). The commands for setting the tape drives 112-1, ..., 112-M (see FIG. 2) offline and online in the application 104-1, ..., or 104-N (see FIG. 2) are configurable via user interface 306 provided with the drive-sharing agent 202 (see FIG. 2).

Automatic Tape Drive Sharing Processes

Figure 4:
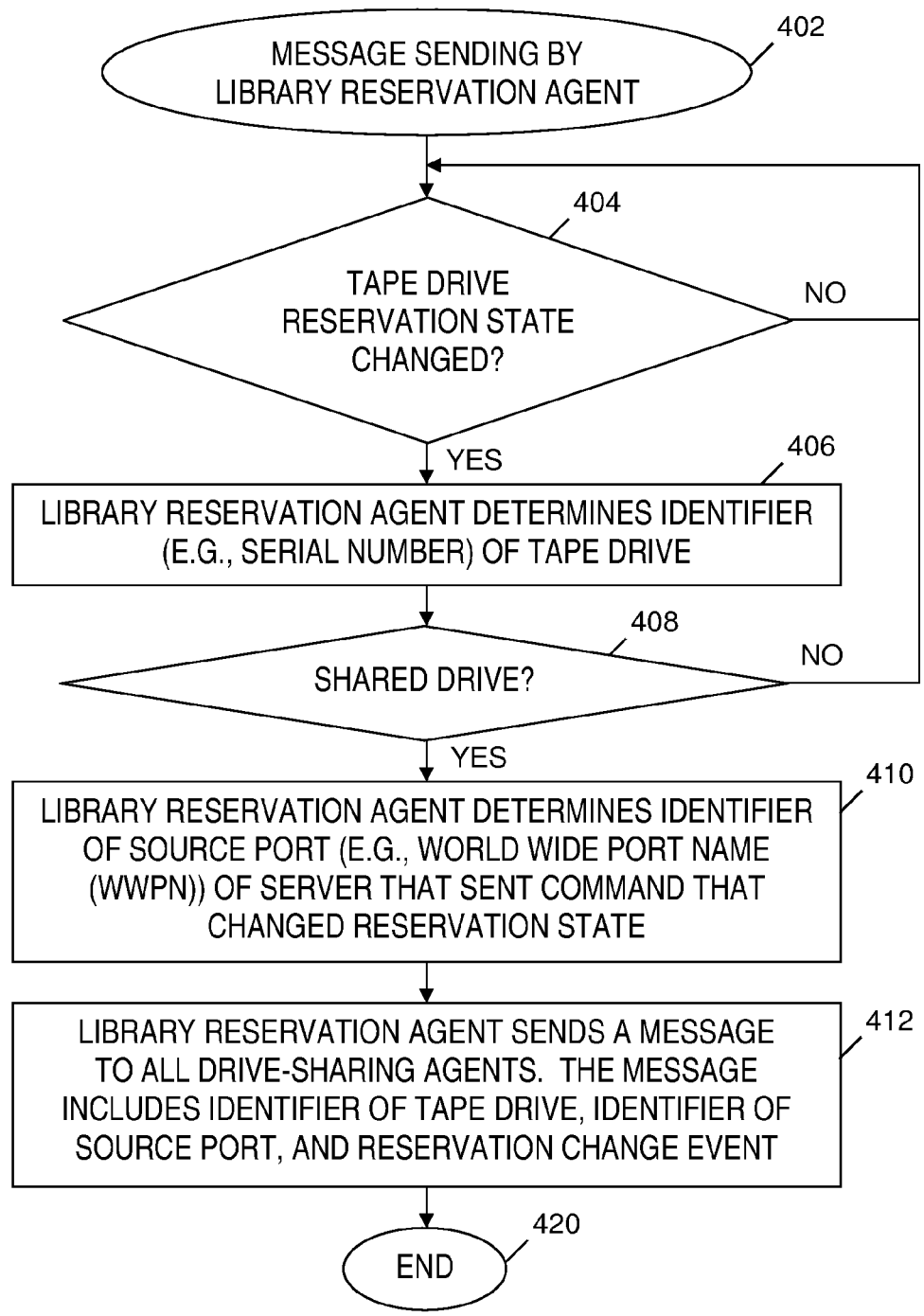
FIG. 4 is a flowchart of an automatic tape drive sharing process in which a library reservation agent included in the system of FIG. 2 sends a message to a drive-sharing agent, in accordance with embodiments of the present invention.

FIG. 4 is a flowchart of an automatic tape drive sharing process in which a library reservation agent 204 included in the system of FIG. 2 sends a message to a drive-sharing agent, in accordance with embodiments of the present invention. The automatic tape drive sharing process implemented with the library reservation agent 204 (see FIG. 2) to send a message to all drive-sharing agents 202 (see FIG. 2) in response to a tape drive (e.g., tape drive 112-1 in FIG. 2) receiving a command to reserve or a command to release the tape drive (e.g., SCSI RESERVE or SCSI RELEASE command) begins at step 402 with each of the tape drives 112-1, ..., 112-M (see FIG. 2) waiting to receive a command that changes the reservation state of the tape drive (i.e., by receiving a reserve or release command).

In step 404, the library reservation agent 204 (see FIG. 2) checks if the reservation state of a tape drive 112-1, ..., or 112-M (see FIG. 2) changed in response to the tape drive receiving a command from an application 104-1, ..., or 104-N (see FIG. 2) via network 106 (see FIG. 2) prior to step 404. The received command reserves or releases the tape drive for the server computer system 102-1, ..., or 102-N (see FIG. 2) that hosts the application 104-1, ..., or 104-N (see FIG. 2) that sent the command. For example, the received command is a SCSI RESERVE command or a SCSI RELEASE command.

In one embodiment, the tape drive 112-1, ..., or 112-M (see FIG. 2) that receives the command that changes the tape drive's reservation state automatically sends a message (a.k.a. reservation state change message) via the interface 118 (see FIG. 2) to the library reservation agent 204 (see FIG. 2) in response to such command being received by the tape drive and the tape drive's reservation state being changed. In another embodiment, the library reservation agent 204 (see FIG. 2) periodically polls each tape drive 112-1, ..., 112-M (see FIG. 2) via interface 118 (see FIG. 2) in order to determine if the reservation state of any of the tape drives has changed.

If library reservation agent 204 (see FIG. 2) determines in step 404 that none of the reservation states of tape drives 112-1, ..., 112-M (see FIG. 2) have changed (i.e., no reserve or release command has been received by a tape drive), then the No branch of step 404 is taken and the process of FIG. 4 repeats starting at a point prior to step 404 in which the tape drives are waiting to receive a command to change a tape drive's reservation state. Otherwise, if library reservation agent 204 (see FIG. 2) determines in step 404 that a reservation state of a tape drive 112-1, ..., or 112-M (see FIG. 2) has changed, then the Yes branch of step 404 is taken and step 406 is performed. Hereinafter in this section, the tape drive 112-1, ..., or 112-M (see FIG. 2) whose reservation state is determined to be changed in step 404 is referred to as "the tape drive."

In step 406, library reservation agent 204 (see FIG. 2) determines the identifier of the tape drive (i.e., the tape drive that received a reserve command or release command via interface 118 (see FIG. 2)). For example, library reservation agent 204 (see FIG. 2) extracts the serial number of the tape drive from the reservation state change message that had been automatically sent to the library reservation agent.

In step 408, the library reservation agent 204 (see FIG. 2) determines whether or not the tape drive that received the reserve or release command is a shared tape drive (i.e., a tape drive shared by multiple applications 102-1, ..., 102-N (see FIG. 2) consulting the library controller 116 (see FIG. 2)). If step 408 determines that the tape drive is not a shared tape drive, then the No branch of step 408 is taken and the process of FIG. 4 flows back to a point prior to step 404, indicating that no further action is required for that tape drive because that tape drive is not shared. Otherwise, if step 408 determines that the tape drive is a shared tape drive, then the Yes branch of step 408 is taken and step 410 is performed.

In step 410, the library reservation agent 204 (see FIG. 2) determines the identifier (e.g., WWPN) of the source port via interface 118 (see FIG. 2) and the tape drive. The source port is the port of one of the server computer systems 102-1, ..., 102-N in FIG. 2 that is the source of the command that changed the reservation state of the tape drive (e.g., the source port for the SCSI RESERVE or SCSI RELEASE command). For example, library reservation agent 204 (see FIG. 2) extracts the WWPN of the source port from the reservation state change message that had been automatically sent to the library reservation agent by the tape drive.

In step 412, the library reservation agent 204 (see FIG. 2) sends a message (e.g., via SNMP) that includes the identifier of the tape drive, the identifier (e.g., WWPN) of the source port, and the reservation change event (i.e., reserve the tape drive or release the tape drive) to all drive-sharing agents 202 (see FIG. 2). Therefore, the network addresses for all drive-sharing agents 202 (see FIG. 2) are configured in the library reservation agent 204 (see FIG. 2). In step 420, the process of FIG. 4 ends.

Figure 5A:
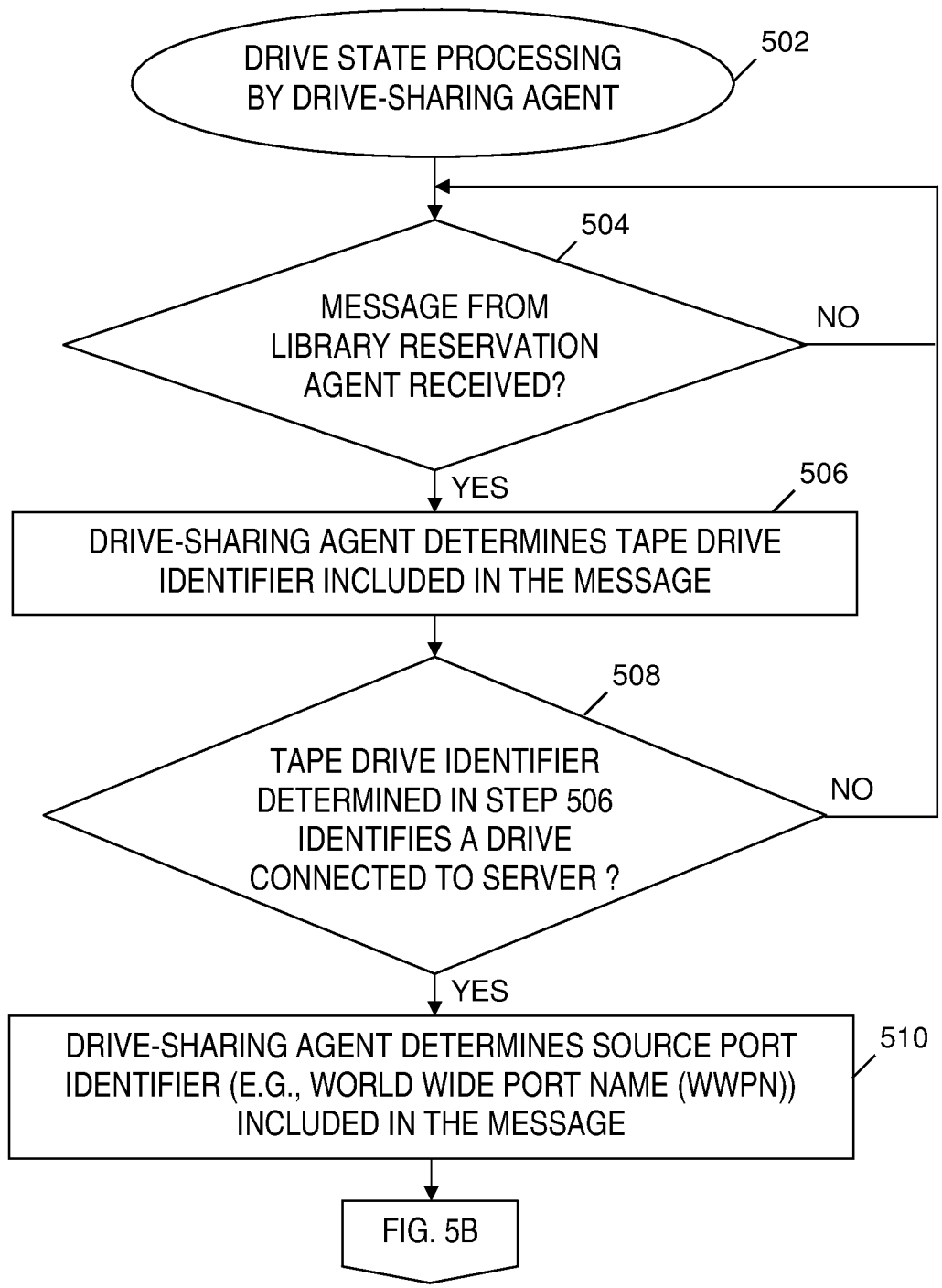
FIGS. 5A-5B depict a flowchart of an automatic tape drive sharing process in which a drive-sharing agent included in the system of FIG. 2 processes a tape drive state, in accordance with embodiments of the present invention.
Figure 5B:
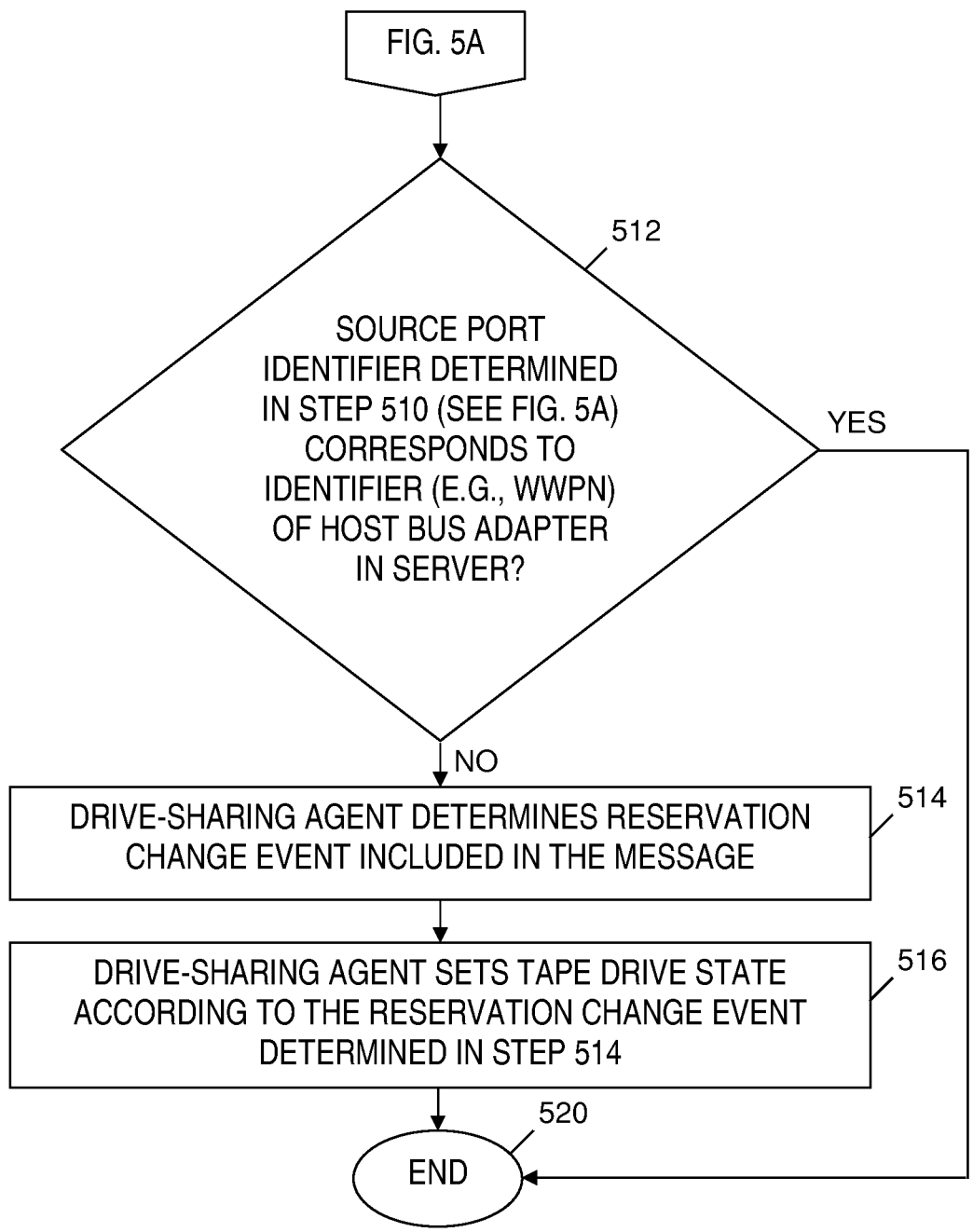

FIGS. 5A-5B depict a flowchart of an automatic tape drive sharing process in which a drive-sharing agent 202 included in the system of FIG. 2 processes a tape drive state, in accordance with embodiments of the present invention. The automatic tape drive sharing process that includes the drive-sharing agent 202 (see FIG. 2) processing a tape drive state begins at step 502 with the drive-sharing agent waiting to receive the message sent in step 412 (see FIG. 4).

In step 504, the drive-sharing agent 202 (see FIG. 2) determines whether or not a message sent by the library reservation agent 204 (see FIG. 2) in step 412 (see FIG. 4) is received by the drive-sharing agent. If the drive-sharing agent 202 (see FIG. 2) determines in step 504 that a message from library reservation agent 204 (see FIG. 2) was not received by the drive-sharing agent, then the No branch of step 504 is taken and the process of FIGS. 5A-5B flows back to a point prior to step 504 in which the drive-sharing agent waits for the message sent in step 412 (see FIG. 4). Otherwise, if the drive-sharing agent 202 (see FIG. 2) determines in step 504 that the message sent in step 412 (see FIG. 4) is received by the drive-sharing agent, then step 506 is performed.

In step 506, the drive-sharing agent 202 (see FIG. 2) determines the identifier of the tape drive (i.e., the tape drive whose reservation state changed in step 404 (see FIG. 4)), where the identifier of the tape drive is included in the message sent by the library reservation agent 204 (see FIG. 2) in step 412 (see FIG. 4). For example, the drive-sharing agent 202 (see FIG. 2) extracts the serial number of the tape drive from the message sent in step 412 (see FIG. 4).

In step 508, the drive-sharing agent 202 (see FIG. 2) determines whether or not the identifier determined in step 506 correlates to a tape drive connected to the server computer system 102-1, . . . , or 102-N (see FIG. 2) that hosts the drive-sharing agent. The server computer system that hosts the drive-sharing agent 202 (see FIG. 2) is also referred to in this section as the hosting server. If drive-sharing agent 202 (see FIG. 2) determines in step 508 that the identifier determined in step 506 does not correlate to a tape drive connected to the hosting server, the No branch of step 508 is taken and the process of FIGS. 5A-5B flows back to step 504. Otherwise, if drive-sharing agent 202 (see FIG. 2) determines in step 508 that the identifier determined in step 506 correlates to a tape drive connected to the hosting server, then the Yes branch of step 508 is taken and step 510 is performed.

In step 510, the drive-sharing agent 202 (see FIG. 2) determines the identifier (e.g., WWPN) of the source port, where the identifier is included in the message sent by the library reservation agent 204 (see FIG. 2) in step 412 (see FIG. 4). For example, drive-sharing agent 202 (see FIG. 2) extracts the WWPN of the source port from the message sent in step 412 (see FIG. 4).

In step 512 of FIG. 5B, the drive-sharing agent 202 (see FIG. 2) checks whether or not the identifier (e.g., WWPN) determined in step 510 (see FIG. 5A) correlates to an identifier (e.g., WWPN) of a host bus adapter installed in the hosting server. If drive-sharing agent 202 (see FIG. 2) determines in step 512 that the identifier determined in step 510 (see FIG. 5A) correlates to a host bus adapter installed in the hosting server, then the Yes branch of step 512 is taken (i.e., indicating that reserve or release command that changed the reservation state in step 404 of FIG. 4 was sent to the tape drive by the application executing on the hosting server) and the process of FIGS. 5A-5B ends at step 520. Otherwise, if drive-sharing agent 202 (see FIG. 2) determines that the identifier determined in step 510 (see FIG. 5A) does not correlate to an identifier of a host bus adapter in the hosting server, then the No branch of step 512 is taken (i.e., indicating that the aforementioned reserve or release command was sent by an application not included in the hosting server) and the process of FIGS. 5A-5B flows to step 514.

In step 514, the drive-sharing agent 202 (see FIG. 2) determines whether the command that changed the reservation state in step 404 (see FIG. 4) is a reserve command or a release command by extracting the reservation change event from the message sent in step 412 (see FIG. 4) and received in step 504 (see FIG. 5A).

In step 516, the drive-sharing agent 202 (see FIG. 2) sets the tape drive's state in the application 104-1, . . . , or 104-N (see FIG. 2) installed in the hosting server according to the determination made in step 514. The setting of the tape drive's state in step 516 utilizes (1) the command line interface 203 (see FIG. 2) to the application 104-1, . . . , or 104-N (see FIG. 2) executing in the hosting server and (2) preconfigured commands in the upper layer 302 (see FIG. 3) of the drive-sharing-agent 202 (see FIG. 2). More precisely, if the drive-sharing agent 202 (see FIG. 2) determines a reserve command (e.g., SCSI RESERVE command) in step 514, then in step 516 the drive-sharing agent sets the tape drive offline in the application 104-1, . . . , or 104-N (see FIG. 2) executing in the hosting server. Otherwise, if the drive-sharing agent 202 (see FIG. 2) determines a release command (e.g., SCSI RELEASE command) in step 514, then in step 516 the drive-sharing agent sets the tape drive online in the application 104-1, . . . , or 104-N (see FIG. 2) in step 516. Following step 516, the process of FIGS. 5A-5B ends at step 520.

Handshake-Enhanced Processes

Figure 6A:
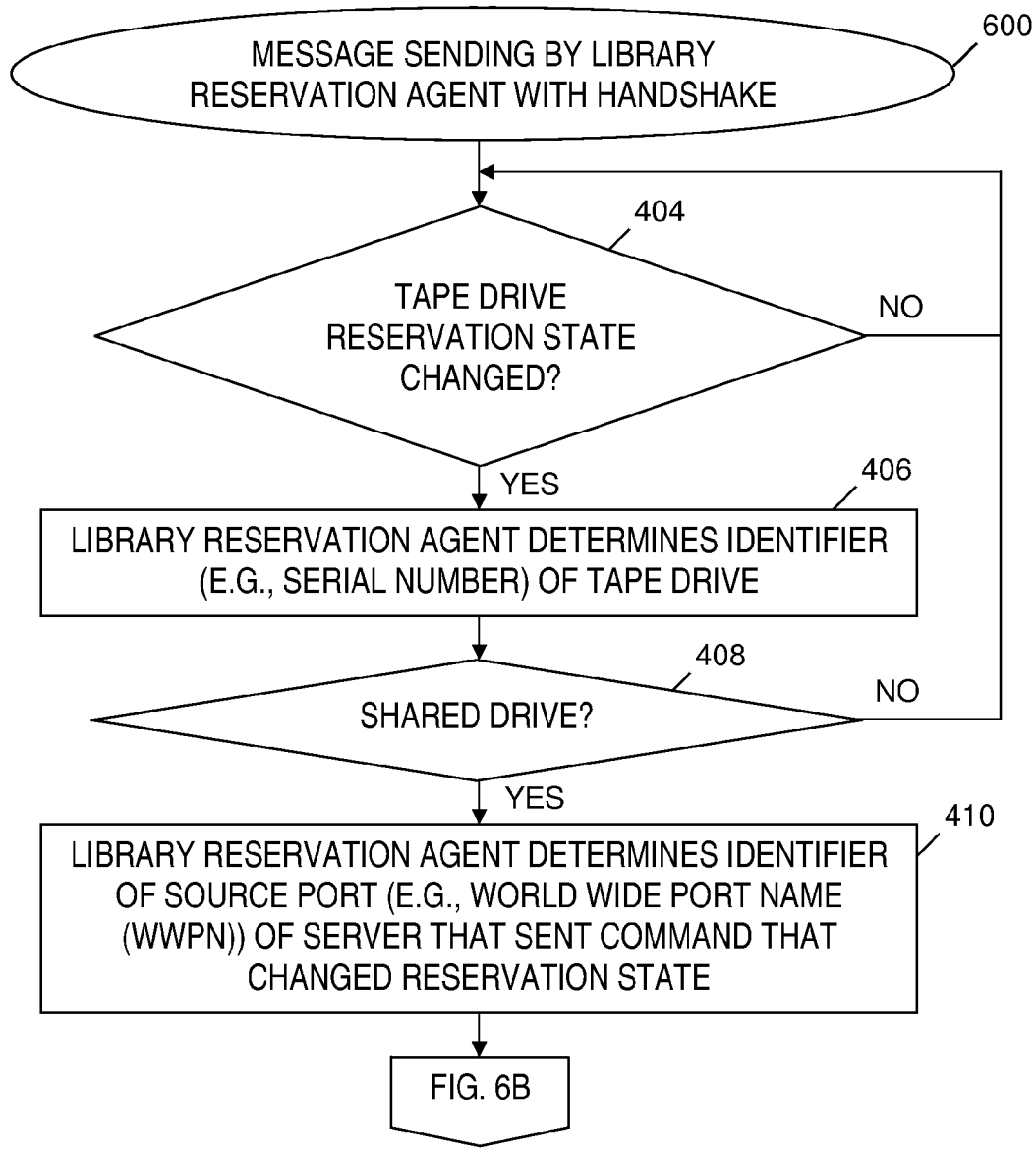
FIGS. 6A-6B depict a flowchart of a handshake-enhanced automatic tape drive sharing process in which a library reservation agent included in the system of FIG. 2 sends a message to a drive-sharing agent, in accordance with embodiments of the present invention.
Figure 6B:
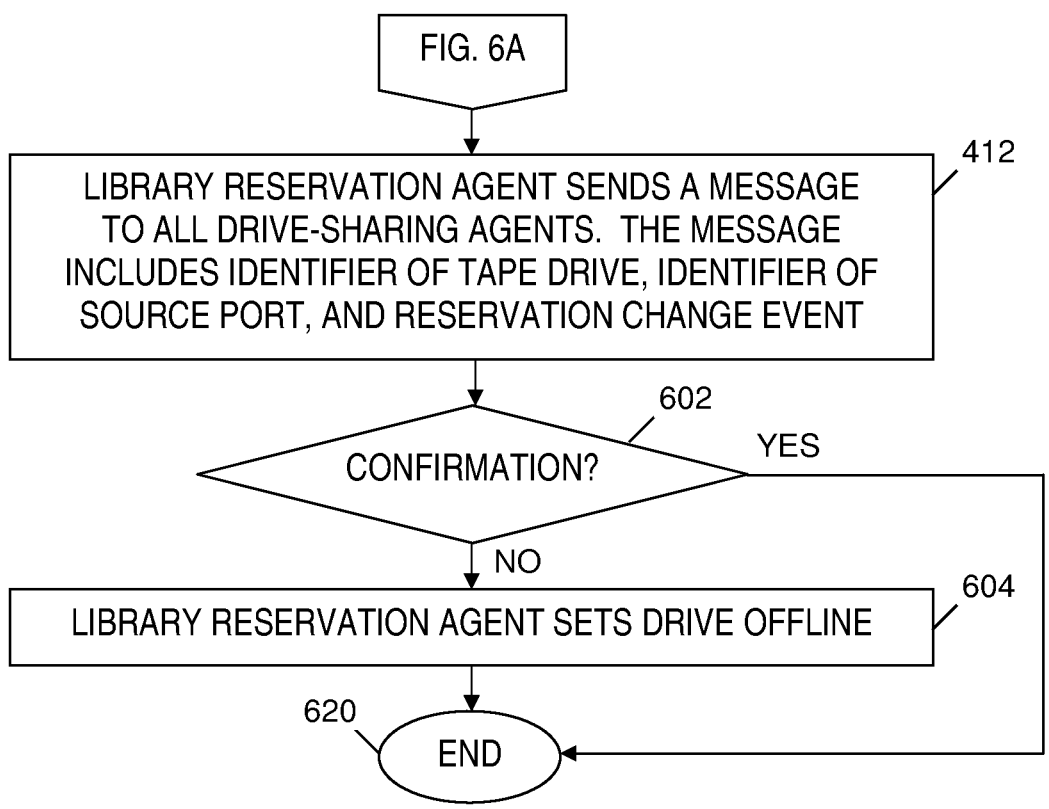

FIGS. 6A-6B depict a flowchart of a handshake-enhanced automatic tape drive sharing process in which a library reservation agent included in the system of FIG. 2 sends a message to a drive-sharing agent, in accordance with embodiments of the present invention. Communication failures when sending the message (see step 412 in FIG. 4) or receiving the message (see step 504 in FIG. 5) may lead to conflicts where multiple applications attempt to access a shared tape drive at the same time. These communication failures are observed by the library reservation agent 204 (see FIG. 2) by implementing a handshake for the message sent in step 412 (see FIG. 4). Thus, the process of FIG. 4 is enhanced with the handshake implementation in the process of FIGS. 6A-6B.

The process of FIGS. 6A-6B begins at step 600 with each of the tape drives 112-1, . . . , 112-M (see FIG. 2) waiting to receive a command that changes the reservation state of the tape drive (i.e., by receiving a reserve command or a release command, such as SCSI RESERVE or a SCSI RELEASE command).

In step 404, the library reservation agent 204 (see FIG. 2) checks if the reservation state of a tape drive 112-1, . . . , or 112-M (see FIG. 2) changed in response to the tape drive receiving a command from an application 104-1, . . . , or 104-N (see FIG. 2) via network 106 (see FIG. 2) prior to step 404. The received command reserves or releases the tape drive for the server computer system 102-1, . . . , or 102-N (see FIG. 2) that hosts the application 104-1, . . . , or 104-N (see FIG. 2) that sent the command. For example, the received command is a SCSI RESERVE command or a SCSI RELEASE command.

In one embodiment, the tape drive 112-1, . . . , or 112-M (see FIG. 2) that receives the command that changes the tape drive's reservation state automatically sends a message (a.k.a. reservation state change message) via the interface 118 (see FIG. 2) to the library reservation agent 204 (see FIG. 2) in response to such command being received by the tape drive and the tape drive's reservation state being changed. In another embodiment, the library reservation agent 204 (see FIG. 2) periodically polls each tape drive 112-1, . . . , 112-M (see FIG. 2) via interface 118 (see FIG. 2) in order to determine if the reservation state of any of the tape drives has changed.

If library reservation agent 204 (see FIG. 2) determines in step 404 that none of the reservation states of tape drives 112-1, . . . , 112-M (see FIG. 2) have changed (i.e., no reserve or release command has been received by any of the tape drives 112-1, . . . , 112-M in FIG. 2), then the No branch of step 404 is taken and the process of FIGS. 6A-6B repeats starting at a point prior to step 404 in which the tape drives are waiting to receive a command to change a tape drive's reservation state. Otherwise, if library reservation agent 204 (see FIG. 2) determines in step 404 that a reservation state of a tape drive 112-1, . . . , or 112-M (see FIG. 2) has changed, then the Yes branch of step 404 is taken and step 406 is performed. Hereinafter in this discussion of FIGS. 6A-6B, the tape drive 112-1, . . . , or 112-M (see FIG. 2) whose reservation state is determined to be changed in step 404 is referred to as "the tape drive."

In step 406, library reservation agent 204 (see FIG. 2) determines the identifier of the tape drive. For example, library reservation agent 204 (see FIG. 2) extracts the serial number of the tape drive from the reservation state change message that had been automatically sent to the library reservation agent.

In step 408, the library reservation agent 204 (see FIG. 2) determines whether or not the tape drive is a shared tape drive (i.e., a tape drive shared by multiple applications 102-1, . . . , 102-N in FIG. 2). If step 408 determines that the tape drive is not a shared tape drive, then the No branch of step 408 is taken and the process of FIGS. 6A-6B flows back to a point prior to step 404, indicating that no further action is required for the tape drive because the tape drive is not shared. Otherwise, if step 408 determines that the tape drive is a shared tape drive, then the Yes branch of step 408 is taken and step 410 is performed.

In step 410, the library reservation agent 204 (see FIG. 2) determines the identifier (e.g., WWPN) of the source port via interface 118 (see FIG. 2) and the tape drive. The source port is the port of one of the server computer systems 102-1, . . . , 102-N in FIG. 2 that is the source of the command that changed the reservation state of the tape drive (e.g., the source port for the SCSI RESERVE or SCSI RELEASE command received by the tape drive). For example, library reservation agent 204 (see FIG. 2) extracts the WWPN of the source port from the reservation state change message that had been automatically sent to the library reservation agent.

In step 412 in FIG. 6B, the library reservation agent 204 (see FIG. 2) sends a message (e.g., via SNMP) that includes the identifier of the tape drive, the identifier (e.g., WWPN) of the source port, and the reservation change event (i.e., reserve the tape drive or release the tape drive) to all drive-sharing agents 202 (see FIG. 2).

In step 602, the library reservation agent 204 (see FIG. 2) waits for confirmation from each drive-sharing agent 202 (see FIG. 2) that the message sent in step 412 has been received. After the library reservation agent 204 (see FIG. 2) waits for a configurable amount of time (e.g., 10 seconds) at step 602, if the library reservation agent has not received one or more confirmations from one or more drive-sharing-agents 202 (see FIG. 2), where the confirmation(s) confirm the reception of the message sent in step 412, the process of FIGS. 6A-6B proceeds to step 604. That is, step 602 checks for a completion of a handshake initiated in step 702 (see FIG. 7B).

In step 604, the library reservation agent 204 (see FIG. 2) sets the tape drive offline by instructing the tape drive via interface 118 (see FIG. 2) to report a permanent error to the application 104-1, . . . , 104-N (see FIG. 2) and to go offline. Performing step 604 prevents access to the tape drive from any application 104-1, . . . , 104-N (see FIG. 2) and eliminates the aforementioned conflicts. The error condition resulting from step 604 may be cleared manually by an administrator. Following step 604, the process of FIGS. 6A-6B ends at step 620.

In an alternate embodiment, before entering step 604, the library reservation agent 204 (see FIG. 2) may retry step 412 in response to determining in step 602 that one or more confirmations are missing (i.e., the No path of step 602). This alternate embodiment makes the method disclosed herein more robust.

Returning to step 602, if the library reservation agent 204 (see FIG. 2) receives confirmations from all drive-sharing agents 202 (see FIG. 2) that confirm reception of the message sent in step 412, then the Yes branch of step 602 is taken and the process of FIGS. 6A-6B ends at step 620.

Figure 7A:
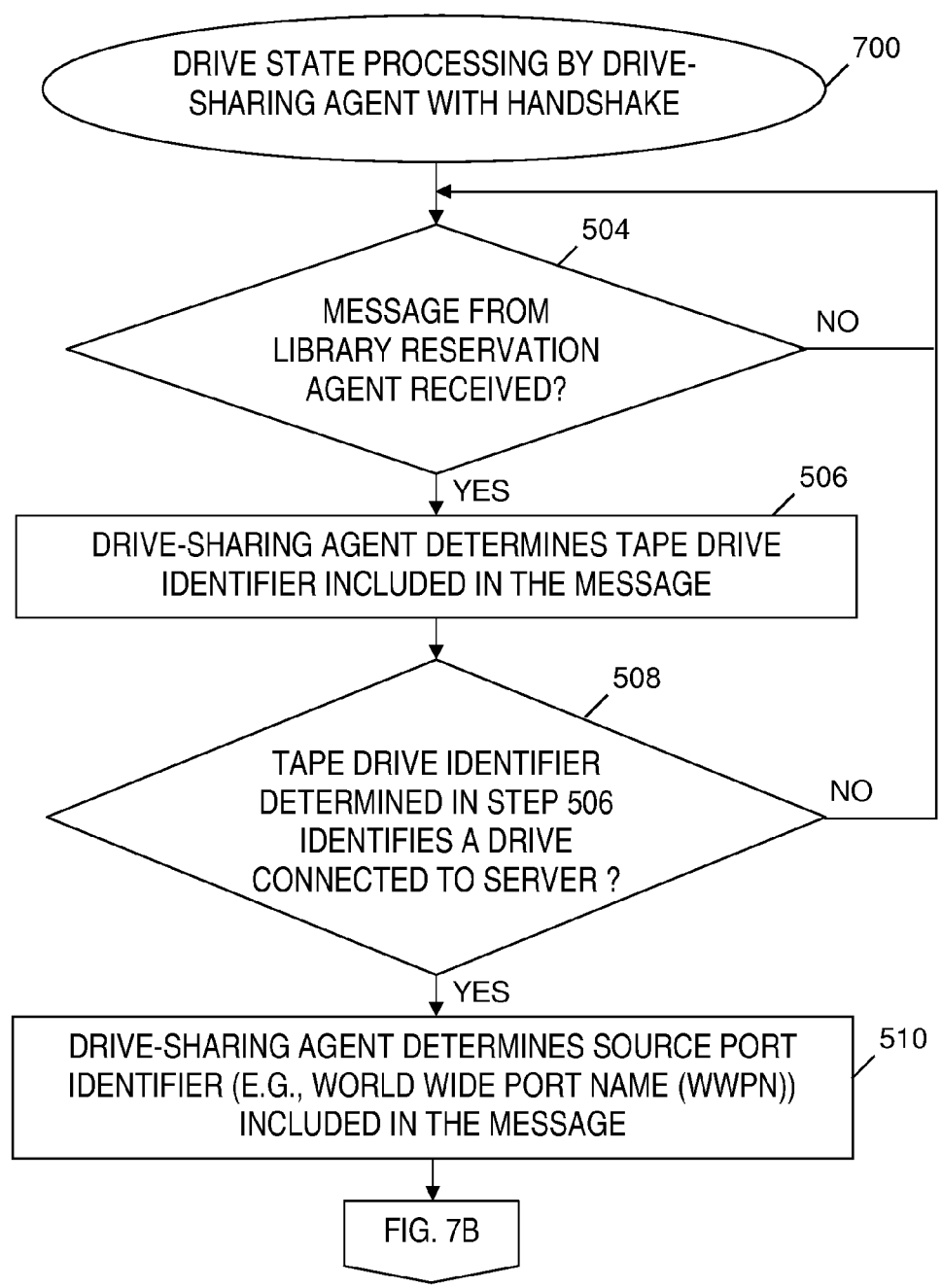
FIGS. 7A-7B depict a flowchart of a handshake-enhanced automatic tape drive sharing process in which a drive-sharing agent included in the system of FIG. 2 processes a tape drive state, in accordance with embodiments of the present invention.
Figure 7B:
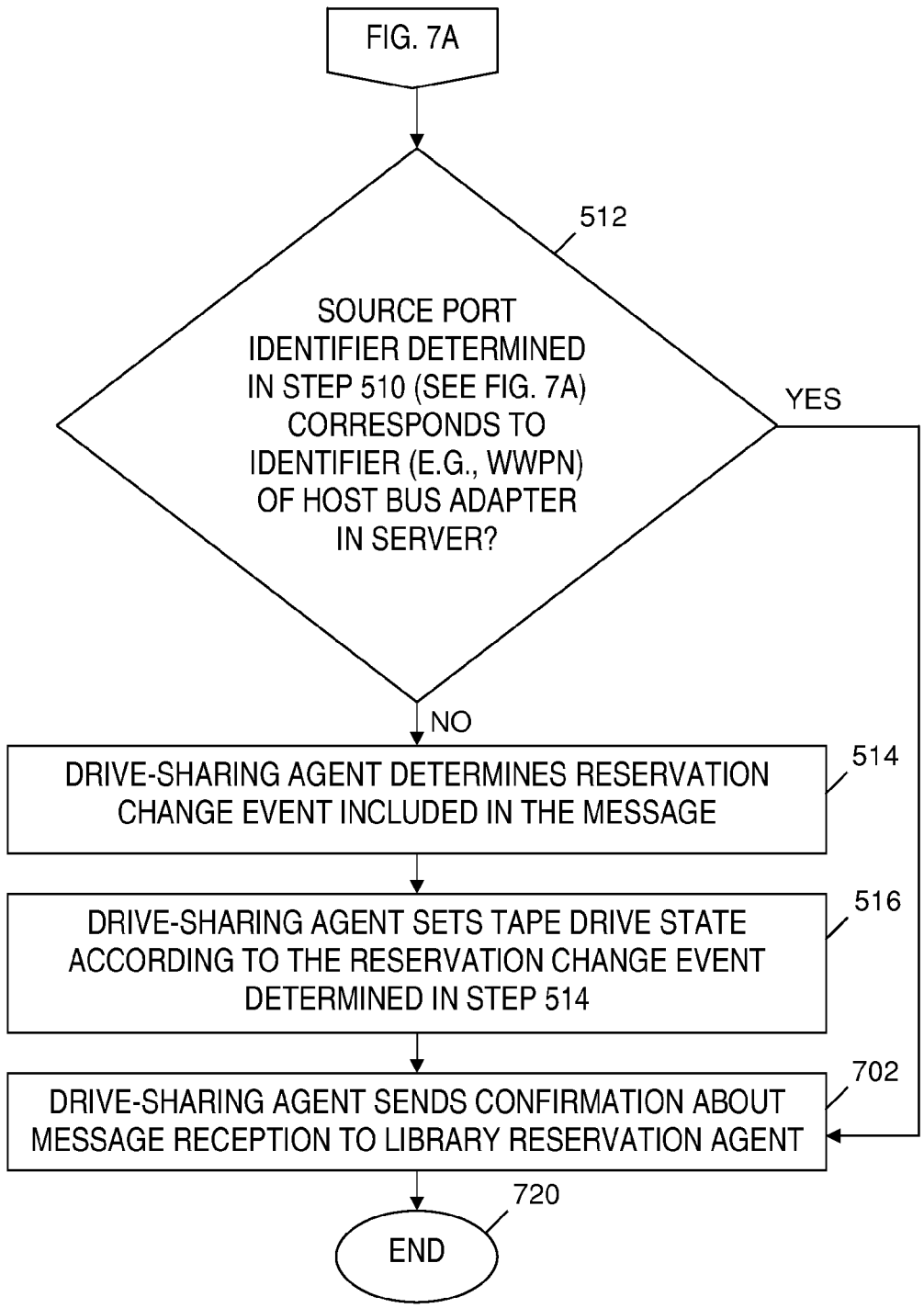

FIGS. 7A-7B depict a flowchart of a handshake-enhanced automatic tape drive sharing process in which a drive-sharing agent included in the system of FIG. 2 processes a tape drive state, in accordance with embodiments of the present invention. The process of FIGS. 5A-5B is enhanced with the handshake implementation in the process of FIGS. 7A-7B. The handshaking implemented in the process of FIGS. 7A-7B is also supported by lower layer 304 (see FIG. 3) of drive-sharing agent 202 (see FIG. 2). The process of FIGS. 7A-7B begins at step 700 with the drive-sharing agent 202 (see FIG. 2) waiting to receive the message sent in step 412 (see FIG. 6B).

In step 504, the drive-sharing agent 202 (see FIG. 2) determines whether or not a message sent by the library reservation agent 204 (see FIG. 2) in step 412 (see FIG. 6B) is received by the drive-sharing agent. If the drive-sharing agent 202 (see FIG. 2) determines in step 504 that a message from library reservation agent 204 (see FIG. 2) was not received by the drive-sharing agent, then the No branch of step 504 is taken and the process of FIGS. 7A-7B flows back to a point prior to step 504 in which the drive-sharing agent waits for the message sent in step 412 (see FIG. 6B). Otherwise, if the drive-sharing agent 202 (see FIG. 2) determines in step 504 that the message sent in step 412 (see FIG. 6B) is received by the drive-sharing agent, then step 506 is performed.

In step 506, the drive-sharing agent 202 (see FIG. 2) determines the identifier of the tape drive (i.e., the tape drive whose reservation state changed in step 404 (see FIG. 6A)), where the identifier of the tape drive is included in the message sent by the library reservation agent 204 (see FIG. 2) in step 412 (see FIG. 6B). For example, the drive-sharing agent 202 (see FIG. 2) extracts the serial number of the tape drive from the message sent in step 412 (see FIG. 6B).

In step 508, the drive-sharing agent 202 (see FIG. 2) determines whether or not the identifier determined in step 506 correlates to a tape drive connected to the server computer system 102-1, . . . , or 102-N (see FIG. 2) that hosts the drive-sharing agent. The server computer system that hosts the drive-sharing agent 202 (see FIG. 2) is also referred to in the discussion of the process of FIGS. 7A-7B as the hosting server. If drive-sharing agent 202 (see FIG. 2) determines in step 508 that the identifier determined in step 506 does not correlate to a tape drive connected to the hosting server, the No branch of step 508 is taken and the process of FIGS. 7A-7B flows back to step 504. Otherwise, if drive-sharing agent 202 (see FIG. 2) determines in step 508 that the identifier determined in step 506 correlates to a tape drive connected to the hosting server, then the Yes branch of step 508 is taken and step 510 is performed.

In step 510, the drive-sharing agent 202 (see FIG. 2) determines the identifier (e.g., WWPN) of the source port, where the identifier is included in the message sent by the library reservation agent 204 (see FIG. 2) in step 412 (see FIG. 6B). For example, drive-sharing agent 202 (see FIG. 2) extracts the WWPN of the source port from the message sent in step 412 (see FIG. 6B).

In step 512 of FIG. 7B, the drive-sharing agent 202 (see FIG. 2) checks whether or not the identifier (e.g., WWPN) determined in step 510 (see FIG. 7A) correlates to an identifier (e.g., WWPN) of a host bus adapter installed in the hosting server. If drive-sharing agent 202 (see FIG. 2) determines in step 512 that the identifier determined in step 510 (see FIG. 7A) correlates to a host bus adapter installed in the hosting server, then the Yes branch of step 512 is taken (i.e., indicating that reserve or release command that changed the reservation state in step 404 of FIG. 6A was sent to the tape drive by the application executing on the hosting server) and step 702 (see below) is performed. Otherwise, if drive-sharing agent 202 (see FIG. 2) determines in step 512 that the identifier determined in step 510 (see FIG. 7A) does not correlate to an identifier of a host bus adapter in the hosting server, then the No branch of step 512 is taken (i.e., indicating that the aforementioned reserve or release command was sent by an application not included in the hosting server) and the process of FIGS. 7A-7B flows to step 514.

In step 514, the drive-sharing agent 202 (see FIG. 2) determines whether the command that changed the reservation state in step 404 (see FIG. 6A) is a reserve command or a release command by extracting the reservation change event from the message sent in step 412 (see FIG. 6B) and received in step 504 (see FIG. 7A).

In step 516, the drive-sharing agent 202 (see FIG. 2) sets the tape drive's state in the application 104-1, . . . , or 104-N (see FIG. 2) installed in the hosting server according to the determination made in step 514. The setting of the tape drive's state in step 516 utilizes (1) the command line interface 203 (see FIG. 2) to the application 104-1, . . . , or 104-N (see FIG. 2) executing in the hosting server and (2) preconfigured commands in the upper layer 302 (see FIG. 3) of the drive-sharing-agent 202 (see FIG. 2). More precisely, if the drive-sharing agent 202 (see FIG. 2) determines a reserve command (e.g., SCSI RESERVE command) in step 514, then in step 516 the drive-sharing agent sets the tape drive offline in the application 104-1, . . . , or 104-N (see FIG. 2) executing in the hosting server. Otherwise, if the drive-sharing agent 202 (see FIG. 2) determines a release command (e.g., SCSI RELEASE command) in step 514, then in step 516 the drive-sharing agent sets the tape drive online in the application 104-1, . . . , or 104-N (see FIG. 2) in step 516.

In step 702, which follows the Yes branch of step 512 and step 516, the drive-sharing agent 202 (see FIG. 2) sends a confirmation to the library reservation agent 204 (see FIG. 2), confirming the drive-sharing agent's reception of the message sent in step 412 (see FIG. 6B). That is, step 702 implements a handshake to the message sent in step 412 (see FIG. 6B), thereby indicating that the message was received and processed by the drive-sharing agent 202 (see FIG. 2). Following step 702, the process of FIGS. 7A-7B ends at step 720.

Thus, the above-described process of FIGS. 7A-7B is an extension of the process of FIGS. 5A-5B, whereby one additional step 702 is added and performed after the Yes branch of step 512 and step 516.

Furthermore, if a drive-sharing agent 202 (see FIG. 2) is started (e.g., when the hosting server starts) or stopped (e.g., when the hosting server is shutdown), it can send a message via network 108 (see FIG. 2) (e.g., using the SNMP protocol) and report its state to the library reservation agent 204 (see FIG. 2). Thus, the library reservation agent 204 (see FIG. 2) keeps track of the state of the associated drive-sharing-agents 202 (see FIG. 2) and will not attempt to send and handshake a message to a drive-sharing-agent that is not started.

Reservation-Sharing Agent

Figure 8:
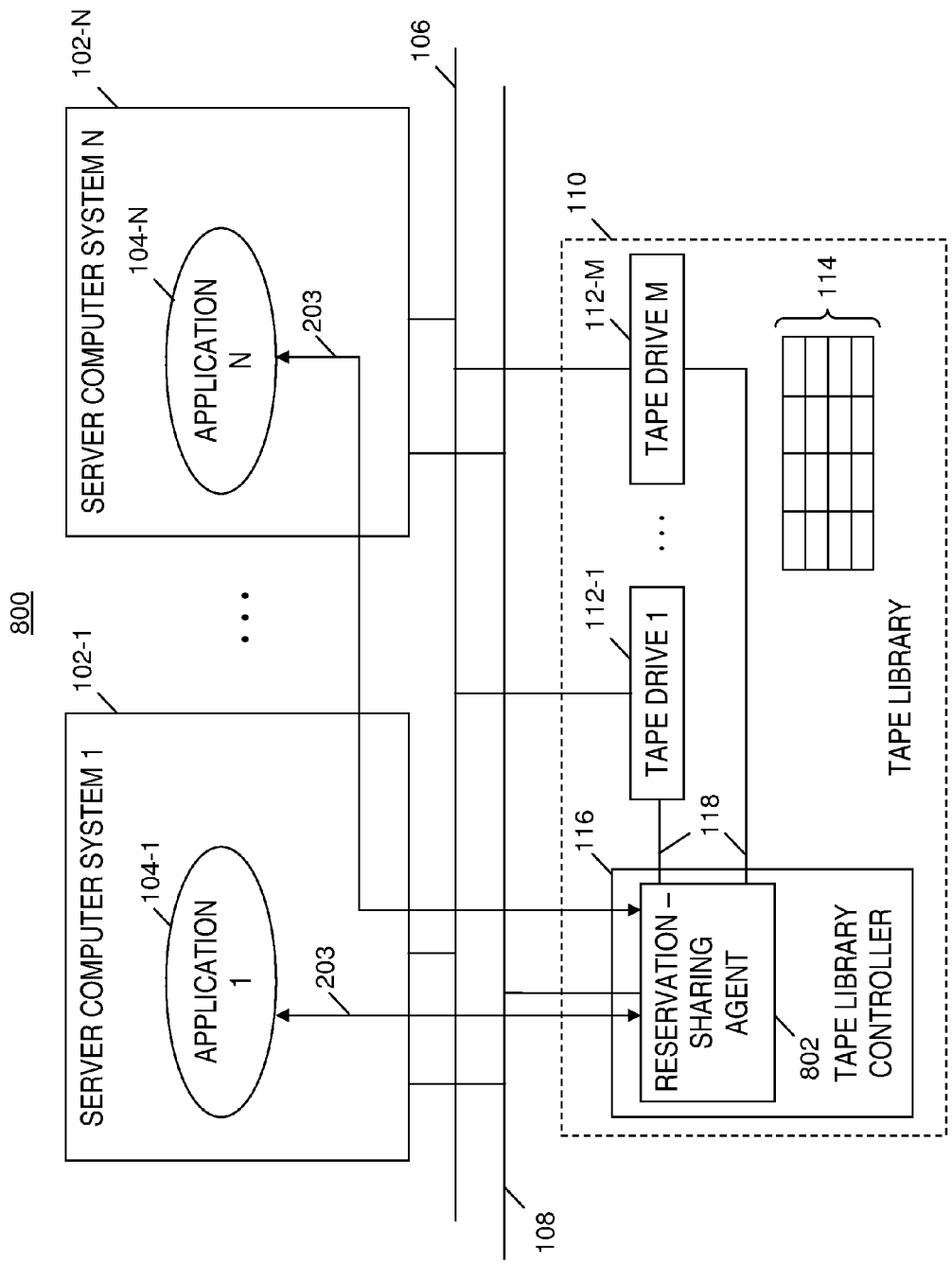
FIG. 8 is a block diagram of a system including a reservation-sharing agent for automatically sharing tape drives in a heterogeneous environment, in accordance with embodiments of the present invention.

FIG. 8 is a block diagram of a system including a reservation-sharing agent for automatically sharing tape drives in a heterogeneous environment, in accordance with embodiments of the present invention. In an alternate embodiment in a system 800, the drive-sharing agent 202 (see FIG. 2) is integrated into the library reservation agent 204 (see FIG. 2) to form a reservation-sharing agent 802 included in tape library controller 116 in FIG. 8. The reservation-sharing agent 802 combines the functionality of the library reservation agent 204 (see FIG. 2) and the drive-sharing agent 202 (see FIG. 2). Thus, the reservation-sharing agent 802 is connected to tape drives 112-1, . . . , 112-M included in tape library 110 via the library-drive interface 118 to obtain the reserve and release notifications. Tape library 110 also includes storage slots 114, which are described above in the discussion of FIG. 2.

The reservation-sharing agent 802 is also connected to the server computer systems 102-1, . . . , 102-N via network 108, allowing the reservation-sharing agent to perform remote commands on such server computer systems by using operating system and/or application APIs (application programming interfaces) 203 executed by drive-sharing agent 202 (see FIG. 2), which is integrated in reservation-sharing agent 802. An operating system API may be based on remote command execution means, such as rexec. An application API allows the execution of administrative commands like the TSM command line interface dsmadmc. The reservation-sharing agent 802 is configurable for the operating system and application type based on the network address of the server computer system 102-1, . . . , 102-N. In an alternate embodiment, reservation-sharing agent 802 is executed in a physical server computer system (not shown) that is different from any of server computer systems 102-1, . . . , 102-N, where the physical server computer system is connected to server computer systems 102-1, . . . , 102-N and to tape library 110 via network 108. In another alternate embodiment, reservation-sharing agent 802 is executed in a software image of a virtual server (not shown) that is connected to server computer systems 102-1, . . . , 102-N and to tape library 110 via network 108.

The reservation-sharing agent 802 obtains a message from a tape drive 112-1, . . . , or 112-M via library-drive interface 118 whenever the tape drive receives a reserve or release command (e.g., SCSI RESERVE command or SCSI RELEASE command) via network 106 from an application 104-1, . . . , or 104-N. Furthermore, via library-drive interface 118, the reservation-sharing agent 802 determines the identifier (a.k.a. the subject identifier) of the tape drive that receives the reserve or release command and the source port identifier (e.g., WWPN) of the port (e.g., Fibre Channel port) pertaining to the server computer system 102-1, . . . , or 102-N (a.k.a. host system) from which the reserve or release command was sent. The identifier (e.g., WWPN) of the source port may be contained in the Fibre Channel protocol stack. Similarly, for an iSCSI implementation, system 800 determines the TCP/IP address of the sender of the command instead of determining the WWPN.

Hereinafter in the discussion of FIG. 8, the subject tape drive that receives the reserve or release command is also referred to as "the tape drive" and the server computer system whose source port identifier is determined by the reservation-sharing agent 802 is also referred to as "the server computer system" or "the host system".

Via the connection 108 to the server computer systems 102-1, . . . , 102-N and its ability to remotely execute commands, the reservation-sharing agent 802 checks if the tape drive with the subject identifier is configured in the host system. For example, if the host system is based on AIX®, then the reservation-sharing agent 802 executes the command "lscfg-vl rmtx" remotely. If the tape drive is configured in a host system, then the reservation-sharing agent 802 may determine the WWPN of the Fibre Channel adapters pertaining to host system. For an AIX® server computer system, determining the WWPN of the Fibre Channel adapters may be done by executing the AIX® command "lsattr-El fcs0". If the tape drive identifier and the WWPN match the information obtained from the tape drive, then the tape drive is set offline or online within the application 104-1, . . . , 104-N hosted by the server computer system (i.e., set offline if the tape drive received a reserve command and set online if the tape drive received a release command). Therefore, the reservation-sharing agent 802 uses capabilities to remotely execute commands for an application.

Similar to the drive-sharing agent 202 (see FIG. 2), the reservation-sharing agent 802 includes a portion that communicates with the server computer system's operating system and to the application 104-1, . . . , or 104-N hosted by the server computer system via interface 203. The aforementioned portion of the reservation-sharing agent 802 is implemented generically and can be configured for each kind of platform and type of application.

In one embodiment, the steps performed in the processes of FIGS. 4, 5A-5B, 6A-6B and 7A-7B may be modified so that the steps are performed by the reservation-sharing agent 802.

Computer System

Figure 9:
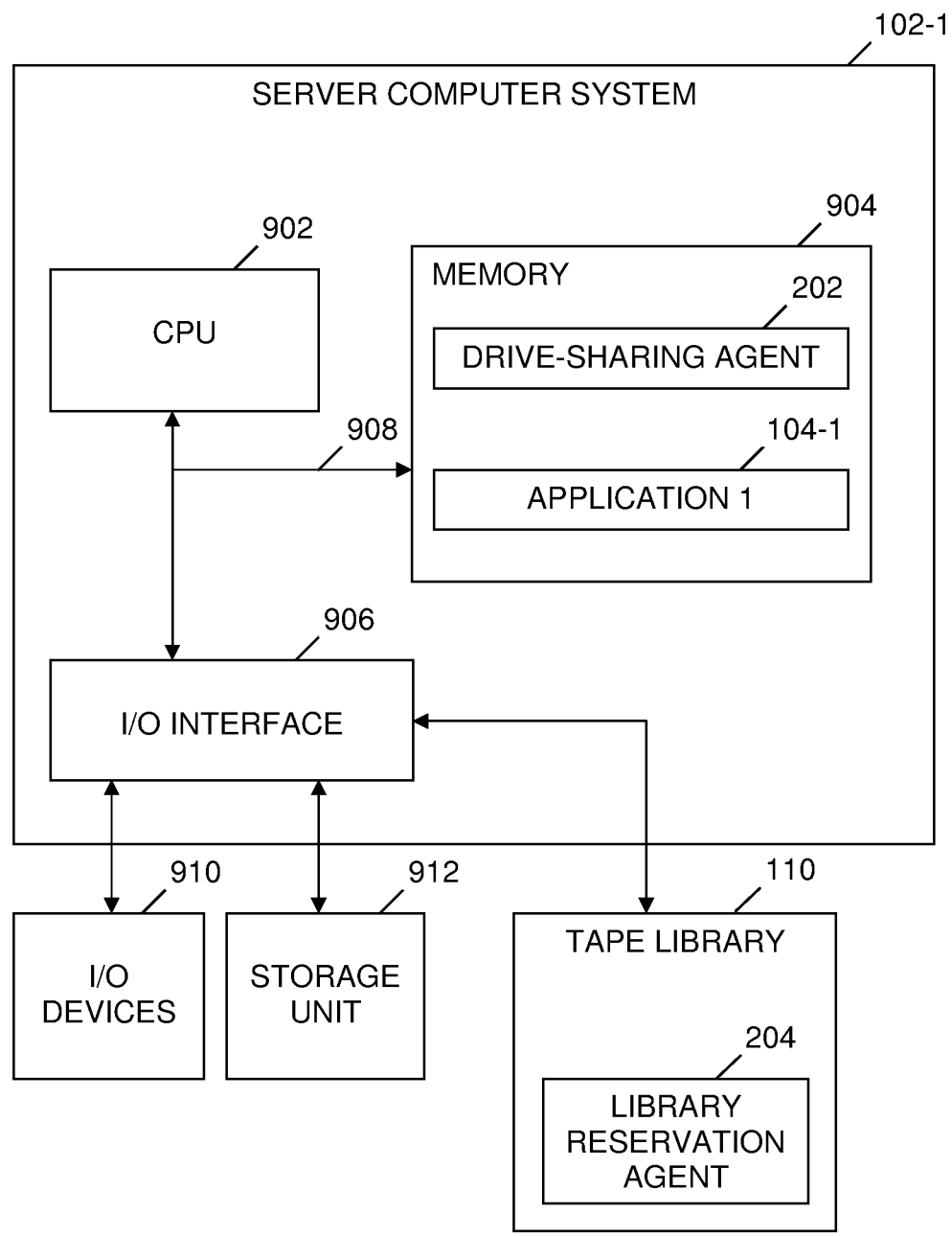
FIG. 9 is a computer system that is included in the system of FIG. 2 and that implements the processes of FIGS. 4 and 5A-5B or the processes of FIGS. 6A-6B and 7A-7B, in accordance with embodiments of the present invention.

FIG. 9 is a computer system that is included in the system of FIG. 2 and that implements the processes of FIGS. 4 and 5A-5B or the processes of FIGS. 6A-6B and 7A-7B, in accordance with embodiments of the present invention. Computer system 102-1 generally comprises a central processing unit (CPU) 902, a memory 904, an input/output (I/O) interface 906, and a bus 908. Further, computer system 102-1 is coupled to I/O devices 910 and a computer data storage unit 912. CPU 902 performs computation and control functions of computer system 102-1. CPU 902 may comprise a single processing unit, or be distributed across one or more processing units in one or more locations (e.g., on a client and server).

Memory 904 may comprise any known type of computer data storage media, including bulk storage, magnetic media, optical media, random access memory (RAM), read-only memory (ROM), a data cache, a data object, etc. In one embodiment, cache memory elements of memory 904 provide temporary storage of at least some program code (e.g., code of drive-sharing agent 202) in order to reduce the number of times code must be retrieved from bulk storage during execution. Moreover, similar to CPU 902, memory 904 may reside at a single physical location, comprising one or more types of data storage, or be distributed across a plurality of physical systems in various forms. Further, memory 904 can include data distributed across, for example, a local area network (LAN) or a wide area network (WAN).

I/O interface 906 comprises any system for exchanging information to or from an external source. I/O devices 910 comprise any known type of external device, including a display device (e.g., monitor), keyboard, mouse, printer, speakers, handheld device, facsimile, etc. Bus 908 provides a communication link between each of the components in computer system 102-1, and may comprise any type of transmission link, including electrical, optical, wireless, etc.

I/O interface 906 also allows computer system 102-1 to store and retrieve information (e.g., data or program instructions such as code of drive-sharing agent 202) from an auxiliary storage device such as computer data storage unit 912 or another computer data storage unit (not shown). Computer data storage unit 912 may be a non-volatile storage device, such as a magnetic disk drive (i.e., hard disk drive) or an optical disc drive (e.g., a CD-ROM drive which receives a CD-ROM disk). Alternatively, a tape library 110 may be connected to I/O interface 906, just like tape library 110 is connected to server computer systems 102-1 . . . 102-N in FIG. 1.

Memory 904 includes computer program code for drive-sharing agent 202 that provides the logic for a process for automatically sharing a tape drive in a heterogeneous computing environment (e.g., the process of FIGS. 5A-5B or the process of FIGS. 7A-7B). Code for drive-sharing agent 202 (a.k.a. code 202 or program 202) is also included in other server computer systems shown in FIG. 2. Further, memory 904 may include other systems not shown in FIG. 9, such as an operating system (e.g., Linux) that runs on CPU 902 and provides control of various components within and/or connected to computer system 102-1. In one embodiment, tape library controller 116 (see FIG. 2) included in tape library 110 includes a processor (not shown) and a memory (not shown) that includes computer program code for library reservation agent 204 (a.k.a. code 204 or program 204) that provides the logic for a process for automatically sharing a tape drive in a heterogeneous computing environment (e.g., the process of FIG. 4 or the process of FIGS. 6A-6B). In an alternate embodiment, drive-sharing agent 202 and library reservation agent 204 do not reside in server computer system 102-1 and tape library 110, respectively, as shown in FIG. 9, but instead are executed either in (1) a physical server computer system (not shown) that includes the components of server computer system 102-1 shown in FIG. 9, where the physical server computer system is connected to server computer systems 102-1, . . . , 102-N (see FIG. 2) and to tape library 110 via network 108 (see FIG. 2), or (2) a software image of a virtual server (not shown) that is connected to server computer systems 102-1, . . . , 102-N (see FIG. 2) and to tape library 110 via network 108 (see FIG. 2).

Memory 904, storage unit 912, and/or one or more other computer data storage units (not shown) that are coupled to computer system 102-1 may store associations (e.g., in a database table) between identifiers of tape drives 112-1, . . . , 112-M (see FIG. 2) and identifiers (e.g., WWPNs) of host bus adapters (not shown) included in computer system 102-1. The processes of FIGS. 4 and 5A-5B or FIGS. 6A-6B and 7A-7B result in a transformation that: (1) transforms a computer data storage unit (e.g., storage unit 912) from a storage unit that does not include an association between an identifier of a tape drive 112-1, . . . , or 112-M (see FIG. 2) and an identifier of a host bus adapter in computer system 102-1 to a storage unit that includes the aforementioned association, or (2) transforms a computer data storage unit (e.g., storage unit 912) from a storage unit that includes the aforementioned association to a storage unit that does not include the aforementioned association.

Any computer system (i.e., an i-th computer system) of the other server computer systems 102-2, . . . , 102-N in FIG. 2 includes the components of computer system 102-1 shown in FIG. 9 and is also operatively coupled to corresponding I/O devices, corresponding computer data storage unit(s), and tape library 110, except that application 1 (i.e., application 104-1) shown in FIG. 9, is replaced with an application i (e.g., application 2 or application 104-2 if i=2, application 3 or application 104-3 if i=3, etc.).

As will be appreciated by one skilled in the art, the present invention may be embodied as a system, method or computer program product. Accordingly, an embodiment of the present invention may be an entirely hardware embodiment, an entirely software embodiment (including firmware, resident software, micro-code, etc.) or an embodiment combining software and hardware aspects that may all generally be referred to herein as a "system" (e.g., system 200 of FIG. 2, computer system 102-1, or a system comprising tape library 110). Furthermore, an embodiment of the present invention may take the form of a computer program product embodied in any tangible medium of expression (e.g., memory 904, computer data storage unit 912, or memory included in tape library controller 116 (see FIG. 2)) having computer-usable program code (e.g., code for drive-sharing agent 202 or library reservation agent 204) embodied or stored in the medium.

Any combination of one or more computer-usable or computer-readable medium(s) (e.g., memory 904, computer data storage unit 912, or memory in tape library controller 116 (see FIG. 2)) may be utilized. The computer-usable or computer-readable medium may be, for example but not limited to, an electronic, magnetic, optical, electromagnetic, infrared or semiconductor system, apparatus, or device. A non-exhaustive list of more specific examples of the computer-readable medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device or a magnetic storage device. Note that the computer-usable or computer-readable medium could even be paper or another suitable medium upon which the program for drive-sharing agent 202 and/or the program for library reservation agent 204 is printed, as the program 202 and program 204 can be electronically captured via, for instance, optical scanning of the paper or other medium, then compiled, interpreted, or otherwise processed in a suitable manner, if necessary, and then stored, respectively, in a computer memory 904 and a memory (not shown) in tape library controller 116 (see FIG. 2). In the context of this document, a computer-usable or computer-readable medium may be any medium that can store the program for use by or in connection with the instruction execution system, apparatus, or device. The computer-usable program code may be transmitted using any appropriate medium, including but not limited to wireless, wireline, optical fiber cable, RF, etc.

Computer program code (e.g., code 202 and/or code 204) for carrying out operations of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server (e.g., computer system 102-1). In the latter scenario, the remote computer may be connected to the user's computer through any type of network (not shown), including a LAN, a WAN, or the connection may be made to an external computer (e.g., through the Internet using an Internet Service Provider).

The present invention is described herein with reference to flowchart illustrations (e.g., FIGS. 4, 5A-5B, 6A-6B, and 7A-7B) and/or block diagrams of methods, apparatus (systems) (e.g., FIG. 2 and FIG. 8), and computer program products according to embodiments of the invention. It will be understood that each block of the flowchart illustrations and/or block diagrams, and combinations of blocks in the flowchart illustrations and/or block diagrams, can be implemented by computer program instructions (e.g., code 202 or code 204). These computer program instructions may be provided to a processor (e.g., CPU 902 or a processor in tape library controller 116 (see FIG. 2)) of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium (e.g., memory 904, computer data storage unit 912, or a memory in tape library controller 116 (see FIG. 2)) that can direct a computer (e.g., computer system 102-1 or tape library controller 116 (see FIG. 2)) or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer (e.g., computer system 102-1 or tape library controller 116 (see FIG. 2)) or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to the process for automatically sharing a tape drive in a heterogeneous computing environment. Thus, an embodiment of the present invention discloses a process for supporting computer infrastructure, comprising integrating, hosting, maintaining and deploying computer-readable code (e.g., code 202 or code 204) into a computer system (e.g., computer system 102-1 or tape library controller 116 (see FIG. 2)), wherein the code in combination with the computer system is capable of performing a process of automatically sharing a tape drive in a heterogeneous computing environment.

In another embodiment, the invention provides a business method that performs the process steps of the invention on a subscription, advertising and/or fee basis. That is, a service provider, such as a Solution Integrator, can offer to create, maintain, support, etc. a process for automatically sharing a tape drive in a heterogeneous computing environment. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIGS. 4, 5A-5B, 6A-6B, and 7A-7B and the block diagrams in FIGS. 2, 8 and 9 illustrate the architecture, functionality, and operation of possible implementations of systems, methods, and computer program products according to various embodiments of the present invention. In this regard, each block in the flowchart or block diagrams may represent a module, segment, or portion of code (e.g., code 202 or code 204), which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A first computer system comprising:
   a central processing unit (CPU);
   a memory coupled to the CPU;
   a computer-readable, tangible storage device coupled to the CPU, the storage device containing instructions that when carried out by the CPU via the memory implement a method of automatically sharing a tape drive in a heterogeneous computing environment, the method comprising the steps of:
      the first computer system receiving a first message that includes an identifier of a tape drive shared among a plurality of computer systems in the heterogeneous computing environment, an identifier of a source port of a second computer system, and an indication of a first change in a reservation status of the tape drive, wherein the first computer system and the second computer system are included in the plurality of computer systems;
      the first computer system determining the tape drive is connected to the first computer system based on the identifier of the tape drive;
      the first computer system extracting the identifier of the source port from the received first message;
      the first computer system determining the extracted identifier of the source port does not identify any host bus adapter installed in the first computer system;
      based on the step of determining the extracted identifier of the source port does not identify any host bus adapter installed in the first computer system, the first computer system determining the indication of the first change indicates a first command from the second computer system that reserves the tape drive for the second computer system; and
      responsive to the step of determining the indication of the first change indicates the first command, the first computer system setting the tape drive offline in a first application executing in the first computer system,
      wherein the step of receiving the first message includes receiving a World Wide Port Name (WWPN) as the identifier of the source port included in the first message, wherein the WWPN identifies a port of the second computer system, wherein the step of determining the identifier of the source port does not identify any host bus adapter installed in the first computer system includes determining the WWPN does not match any WWPN that identifies any host bus adapter installed in the first computer system, and wherein the step of determining the indication of the first change indicates the first command from the second computer system that reserves the tape drive for the second computer system is further based on the step of determining the WWPN does not match any WWPN that identifies any host bus adapter installed in the first computer system.

2. The first computer system of claim 1, wherein the step of receiving the first message includes the step of receiving the first message from a library reservation agent and by a drive-sharing agent that maintains a database table that includes identifiers of a plurality of tape drives connected to the first computer system and that further includes identifiers of host bus adapters connected to the plurality of tape drives, wherein the host bus adapters are installed in the first computer system, wherein the tape drive is included in the plurality of tape drives, wherein the step of determining the identifier of the source port does not identify any host bus adapter installed in the first computer system includes the step of the drive-sharing agent determining, based on the database table, the identifier of the tape drive included in the first message is not associated with any host bus adapter installed in the first computer system, wherein the library reservation agent is a software agent executing in a tape library controller included in a tape library coupled to the plurality of computer systems, and wherein the drive-sharing agent is a software agent executing in the first computer system.

3. The first computer system of claim 2, wherein the method further comprises the steps of:
   the drive-sharing agent determining a plurality of serial numbers of the plurality of tape drives;
   the drive-sharing agent determining a plurality of World Wide Port Names (WWPNs) of a plurality of Fibre Channel ports at which the plurality of tape drives are attached to the first computer system; and
   the first computer system storing, in the database table, an association between the plurality of serial numbers and the plurality of WWPNs, wherein the step of determining, based on the database table, the identifier of the tape drive is not associated with any host bus adapter installed in the first computer system includes determining the association between the plurality of serial numbers and the plurality of WWPNs does not include an association between a serial number of the tape drive and the plurality of WWPNs.

4. The first computer system of claim 2, wherein the step of setting the tape drive offline in the first application includes the drive-sharing agent setting the tape drive offline by a command provided by a command line interface of the first application.

5. The first computer system of claim 1, wherein the method further comprises the steps of:
   the first computer system receiving a second message that includes the identifier of the tape drive, the identifier of the source port of the second computer system, and an indication of a second change in the reservation status of the tape drive;
   the first computer system determining the indication of the second change indicates a second command from the second computer system that releases the tape drive from being reserved for the second computer system; and
   responsive to the step of determining the indication of the second change indicates the second command, the first computer system setting the tape drive online in the first application executing in the first computer system.

6. The first computer system of claim 5, wherein the step of receiving the second message includes the step of receiving the second message from a library reservation agent and by a first layer of a drive-sharing agent having the first layer and a second layer, wherein the library reservation agent is executing in a tape library controller included in a tape library coupled to the plurality of computer systems, wherein the drive-sharing agent is executing in the first computer system, and wherein the setting the tape drive online in the first application includes the second layer of the drive-sharing agent setting the tape drive online by a command provided by a command line interface of the first application.

7. A computing system comprising:
   a central processing unit (CPU);
   a memory coupled to the CPU;
   a computer-readable, tangible storage device coupled to the CPU, the storage device containing instructions of a library reservation agent that when executed by the CPU via the memory implement a method of automatically sharing a tape drive in a heterogeneous computing environment, the method comprising the steps of:
      by executing the library reservation agent, the computing system receiving a first message from the tape drive based on a command received by the tape drive from a first computer system to reserve the tape drive for the first computer system, wherein the library reservation agent is a software agent executing in a tape library controller coupled via a network to a plurality of computer systems in the heterogeneous environment, wherein the first computer system is included in the plurality of computer systems, and wherein each computer system of the plurality of computer systems executes a respective drive-sharing agent included in a plurality of drive-sharing agents;
      the computing system determining an identifier of the tape drive from the received first message;
      the computing system determining the tape drive is shared among the plurality of computer systems, wherein the step of determining the tape drive is shared is based on the identifier of the tape drive;
      the computing system determining an identifier of a source port of the first computer system of the plurality of computer systems from the received first message;
      the computing system sending a plurality of messages to respective drive-sharing agents of the plurality of drive-sharing agents executing in the plurality of computer systems, wherein each message includes the identifier of the tape drive, the identifier of the source port, and an indication of reserving the tape drive for the first computer system; and
      the computing system receiving a plurality of confirmations from the plurality of drive-sharing agents, the confirmations confirming receipt of the plurality of messages by the plurality of drive-sharing agents, wherein a first result of the step of sending the plurality of messages and the step of receiving the plurality of confirmations is an offline state of the tape drive being set in applications and by drive-sharing agents of the plurality of drive-sharing agents executing in computer systems of the plurality of computer systems that do not include the first computer system,
      wherein the step of sending the plurality of messages includes the step of sending a World Wide Port Name (WWPN) as the identifier of the source port included in a second message included in the plurality of messages,
      wherein a second result of the step of sending the plurality of messages includes a first determination that the tape drive is connected to a second computer system included in the plurality of computer systems based on the identifier of the tape drive,
      wherein a third result of the step of sending the plurality of messages includes an extraction of the identifier of the source port from the second message,
      wherein a fourth result of the step of sending the plurality of messages includes a second determination by the second computer system that the WWPN does not match any WWPN that identifies any host bus adapter installed in the second computer system, and
      wherein a fifth result of the step of sending the plurality of messages includes a third determination that the indication of reserving the tape drive for the first computer system indicates the command received by the tape drive from the first computer system to reserve the tape drive for the first computer system is based on the second determination that the WWPN does not match any WWPN that identifies any host bus adapter installed in the second computer system.

8. The computing system of claim 7, further comprising the step of the computing system periodically polling a plurality of tape drives being controlled by the tape library controller to determine if any reservation status of any tape drive of the plurality of tape drives is changed, wherein the tape drive is included in the plurality of tape drives, and wherein the step of receiving the first message from the tape drive is performed in response to the periodically polling the plurality of tape drives.

9. The computing system of claim 7, wherein the command is a Small Computer System Interface (SCSI) command selected from the group consisting of a SCSI reserve command and a SCSI release command.

10. A computer program product, comprising:
   a computer-readable, tangible storage device; and
   a computer-readable program code stored on the computer-readable, tangible storage device, the computer-readable program code containing instructions of a library reservation agent configured to be executed by a processor of a computing system to implement a method of automatically sharing a tape drive in a heterogeneous computing environment, the method comprising the steps of:
      by executing the library reservation agent, the computing system receiving a first message from the tape drive based on a command received by the tape drive from a first computer system to reserve the tape drive for the first computer system, wherein the library reservation agent is a software agent executing in a tape library controller coupled via a network to a plurality of computer systems in the heterogeneous environment, wherein the first computer system is included in the plurality of computer systems, and wherein each computer system of the plurality of computer systems executes a respective drive-sharing agent included in a plurality of drive-sharing agents;
      the computing system determining an identifier of the tape drive from the received first message;
      the computing system determining the tape drive is shared among the plurality of computer systems, wherein the step of determining the tape drive is shared is based on the identifier of the tape drive;

the computing system determining an identifier of a source port of the first computer system of the plurality of computer systems from the received first message;

the computing system sending a plurality of messages to respective drive-sharing agents of the plurality of drive-sharing agents executing in the plurality of computer systems, wherein each message includes the identifier of the tape drive, the identifier of the source port, and an indication of reserving the tape drive for the first computer system; and the computing system receiving a plurality of confirmations from the plurality of drive-sharing agents, the confirmations confirming receipt of the plurality of messages by the plurality of drive-sharing agents, wherein a first result of the step of sending the plurality of messages and the step of receiving the plurality of confirmations is an offline state of the tape drive being set in applications and by drive-sharing agents of the plurality of drive-sharing agents executing in computer systems of the plurality of computer systems that do not include the first computer system, wherein the step of sending the plurality of messages includes the step of sending a World Wide Port Name (WWPN) as the identifier of the source port included in a second message included in the plurality of messages, wherein a second result of the step of sending the plurality of messages includes a first determination that the tape drive is connected to a second computer system included in the plurality of computer systems based on the identifier of the tape drive, wherein a third result of the step of sending the plurality of messages includes an extraction of the identifier of the source port from the second message, wherein a fourth result of the step of sending the plurality of messages includes a second determination by the second computer system that the WWPN does not match any WWPN that identifies any host bus adapter installed in the second computer system, and wherein a fifth result of the step of sending the plurality of messages includes a third determination that the indication of reserving the tape drive for the first computer system indicates the command received by the tape drive from the first computer system to reserve the tape drive for the first computer system is based on the second determination that the WWPN does not match any WWPN that identifies any host bus adapter installed in the second computer system.

11. The program product of claim 10, wherein the method further comprising the step of the computing system periodically polling a plurality of tape drives being controlled by the tape library controller to determine if any reservation status of any tape drive of the plurality of tape drives is changed, wherein the tape drive is included in the plurality of tape drives, and wherein the step of receiving the first message from the tape drive is performed in response to the periodically polling the plurality of tape drives.

12. The program product of claim 10, wherein the command is a Small Computer System Interface (SCSI) command selected from the group consisting of a SCSI reserve command and a SCSI release command.

13. A computing system comprising:
a central processing unit (CPU);
a memory coupled to the CPU;
a computer-readable, tangible storage device coupled to the CPU, the storage device containing instructions of a reservation-sharing agent that when executed by the CPU via the memory implement a method of automatically sharing a tape drive in a heterogeneous computing environment, the method comprising the steps of:

by executing the reservation-sharing agent, the computing system determining a change in a reservation status of a tape drive based on a command received by the tape drive, wherein the reservation-sharing agent is a software agent executing in a tape library controller coupled via a network to a plurality of computer systems in the heterogeneous environment;

the computing system determining an identifier of the tape drive;

the computing system determining the tape drive is shared among the plurality of computer systems, wherein the step of determining the tape drive is shared is based on the identifier of the tape drive;

the computing system determining an identifier of a source port of a first computer system of the plurality of computer systems, wherein the command is received by the tape drive from the first computer system;

the computing system determining the tape drive is connected to a second computer system of the plurality of computer systems based on the identifier of the tape drive;

the computing system determining the identifier of the source port does not identify any host bus adapter installed in the second computer system;

based on the step of determining the identifier of the source port does not identify any host bus adapter installed in the second computer system, the computing system determining the change in the reservation status includes a reservation of the tape drive for the first computer system by the command; and responsive to the step of determining the change in the reservation status includes the reservation of the tape drive, the computing system setting the tape drive offline in an application executing in the second computer system, wherein the step of determining the identifier of the source port of the first computer system includes the step of determining a World Wide Port Name (WWPN) as the identifier of the source port, wherein the step of determining the identifier of the source port does not identify any host bus adapter installed in the second computer system includes the step of determining the WWPN does not match any WWPN that identifies any host bus adapter installed in the second computer system, and wherein the step of determining the change in the reservation status includes the reservation of the tape drive for the first computer system by the command is based on the step of determining the WWPN does not match any WWPN that identifies any host bus adapter installed in the second computer system.

14. A computer program product, comprising:
a computer-readable, tangible storage device; and
a computer-readable program code stored on the computer-readable, tangible storage device, the computer-readable program code containing instructions of a reservation-sharing agent configured to be executed by a processor of a computing system to implement a method of automatically sharing a tape drive in a heterogeneous computing environment, the method comprising the steps of:

by executing the reservation-sharing agent, the computing system determining a change in a reservation status of a tape drive based on a command received by the tape drive, wherein the reservation-sharing agent is a software agent executing in a tape library controller coupled via a network to a plurality of computer systems in the heterogeneous environment;

the computing system determining an identifier of the tape drive;

the computing system determining the tape drive is shared among the plurality of computer systems, wherein the step of determining the tape drive is shared is based on the identifier of the tape drive;

the computing system determining an identifier of a source port of a first computer system of the plurality of computer systems, wherein the command is received by the tape drive from the first computer system;

the computing system determining the tape drive is connected to a second computer system of the plurality of computer systems based on the identifier of the tape drive;

the computing system determining the identifier of the source port does not identify any host bus adapter installed in the second computer system;

based on the step of determining the identifier of the source port does not identify any host bus adapter installed in the second computer system, the computing system determining the change in the reservation status includes a reservation of the tape drive for the first computer system by the command; and responsive to the step of determining the change in the reservation status includes the reservation of the tape drive, the computing system setting the tape drive offline in an application executing in the second computer system, wherein the step of determining the identifier of the source port of the first computer system includes the step of determining a World Wide Port Name (WWPN) as the identifier of the source port, wherein the step of determining the identifier of the source port does not identify any host bus adapter installed in the second computer system includes the step of determining the WWPN does not match any WWPN that identifies any host bus adapter installed in the second computer system, and wherein the step of determining the change in the reservation status includes the reservation of the tape drive for the first computer system by the command is based on the step of determining the WWPN does not match any WWPN that identifies any host bus adapter installed in the second computer system.

\* \* \* \* \*